United States Patent [19]

Hetherington et al.

[11] Patent Number: 5,285,323
[45] Date of Patent: Feb. 8, 1994

[54] INTEGRATED CIRCUIT CHIP HAVING PRIMARY AND SECONDARY RANDOM ACCESS MEMORIES FOR A HIERARCHICAL CACHE

[75] Inventors: Ricky C. Hetherington, Northborough; Francis X. McKeen, Westborough; Joseph D. Marci, Boston; Tryggve Fossum, Northborough; Joel S. Emer, Acton, all of Mass.

[73] Assignee: Digital Equipment Corporation, Maynard, Mass.

[21] Appl. No.: 61,273

[22] Filed: May 13, 1993

Related U.S. Application Data

[63] Continuation of Ser. No. 593,763, Oct. 5, 1990, abandoned.

[51] Int. Cl.$^5$ .............................................. G06F 12/08
[52] U.S. Cl. ................................... 395/425; 364/252; 364/260; 364/159.1; 364/164.8; 364/964.34; 345/200

[56] References Cited

U.S. PATENT DOCUMENTS

| | | | |
|---|---|---|---|
| 4,594,690 | 6/1986 | Meyers et al. | 365/230 |
| 4,712,190 | 12/1987 | Guglielmi et al. | 395/425 |
| 4,905,188 | 2/1990 | Chuang et al. | 395/425 |
| 4,914,656 | 4/1990 | Dunphy, Jr. et al. | 371/10.2 |
| 4,961,153 | 10/1990 | Fredrickson et al. | 364/521 |
| 4,992,961 | 2/1991 | Petersen | 364/521 |
| 5,023,776 | 6/1991 | Gregor | 395/425 |
| 5,029,105 | 7/1991 | Coleman et al. | 364/518 |
| 5,058,051 | 10/1991 | Brooks | 364/900 |
| 5,107,462 | 4/1992 | Grundmann et al. | 365/189.02 |
| 5,151,997 | 9/1992 | Bailey et al. | 395/800 |
| 5,157,776 | 10/1992 | Foster | 395/425 |

FOREIGN PATENT DOCUMENTS

| | | |
|---|---|---|
| 0166192 | 1/1986 | European Pat. Off. |
| 2215887A | 9/1989 | United Kingdom |

OTHER PUBLICATIONS

Kalter et al., "A 50ns 16Mb DRAM with a 10ns Data Rate," 1990 IEEE International Solid-State Conference, Feb. 16, 1990, pp. 232-233, 303.

A. J. Smith, "Cache Memories," Computing Surveys, vol. 14, No. 3, Sep. 1982, pp. 474-530.

Richard E. Matick, "Functional Cache Chip for Improved System Performance," IBM J. Res. Develop., vol. 33, No. 1, Jan., 1989, pp. 15-32.

Richard E. Matick, et al., "Architecture, Design, and Operating Characteristics of a 12-ns CMOS Functional Cache Chip," IBM J. Res. Develop., vol. 33, No. 5, Sep. 1989 pp. 524-539.

Primary Examiner—Joseph L. Dixon
Assistant Examiner—Behzad James Peikari
Attorney, Agent, or Firm—Arnold, White & Durkee

[57] ABSTRACT

A hierarchical cache memory includes a high-speed primary cache memory and a lower speed secondary cache memory of greater storage capacity than the primary cache memory. To manage a huge number of data lines interconnecting the primary and secondary cache memories, the hierarchical cache memory is integrated on a plurality of integrated circuits which include all of the interconnecting data lines. Each integrated circuit includes a primary memory and a secondary memory for storing and retrieving data transferred over a first data input line and a first data output line that link the primary memory to a central processing unit. At any given time, a multi-bit word is addressed in the secondary memory, and a corresponding multi-bit word is addressed in the primary memory. The primary and secondary memories are interconnected by a first multi-line bus for transferring a multi-bit word read from the secondary memory to the primary memory, and by a second multi-line bus for transferring a multi-bit word read from the primary memory to the secondary memory. The secondary memory is linked to a main memory by a second data output line and a second data input line for sequential transmission of bits to exchange multi-bit words during a writeback and refill operation. In a preferred embodiment, data inputs of the primary memory and the secondary memory are wired in parallel to a serial-parallel shift register that is used as a common write buffer.

16 Claims, 11 Drawing Sheets

INTEGRATED CIRCUIT CHIP HAVING PRIMARY AND SECONDARY RANDOM ACCESS MEMORIES FOR A HIERARCHICAL CACHE

This application is a continuation of application Ser. No. 07/593,763, filed Oct. 5, 1990 now abandoned.

BACKGROUND OF THE INVENTION

1. Technical Field

The present invention relates generally to cache memories, and more particularly to an integrated circuit memory especially adapted for performing cache memory functions. Specifically, the present invention relates to an integrated circuit including high speed memory, a lower-speed memory of greater capacity, and interconnecting data path circuits for constructing a hierarchical cache memory.

2. Description of the Background Art

In the field of high speed computing, processor speed is generally limited by memory performance. For example, a central processing unit (CPU) executes instructions at a predetermined rate. Similarly, main memory performs read and write operations at a second predetermined rate which is typically at least an order of magnitude slower than the CPU execution rate. If the CPU were to access the main memory directly during the execution of memory access instructions, the CPU performance would degrade to the memory access rate. In this case the CPU would have to stall while waiting for the main memory to complete its access cycle for each memory access instruction.

It is possible to construct a special purpose memory which has a cycle time approximately equal to that of the CPU's instruction cycle time. Unfortunately, such special-purpose memories use high-speed static random access memory (RAM) which is far more expensive than the typical dynamic RAM used in main memory. Accordingly, many computer systems compromise by constructing a relatively small cache of high-speed memory while retaining the slower semiconductor memory in the main memory.

The cache is managed under hardware control to maintain a copy of a portion of the main memory contents which is likely to be used by the CPU. Thus, as long as the CPU accesses only those memory locations maintained in the cache, the CPU will execute at full speed. Of course, it is inevitable that the CPU will occasionally attempt to read a memory location which is not contained in the cache. During these misses, the data are retrieved from main memory and stored in the cache. Therefore, CPU performance degrades to the main memory access rate during misses, but the misses are relatively infrequent so that the overall speed of the processor is enhanced by the use of the high-speed cache.

In recent times, processors have been introduced that have execution cycle times below the access times of typical static RAM memories. These processors, for example, have cycle times under 10 nanoseconds. Because such a fast execution speed is poorly matched to the access time of static RAM cache memories, these processors are designed with "on-chip" cache memories that provide an additional level of memory between the processor and the cache memory. The on-chip cache memories eliminate inter-chip data transmission delay, but they are necessarily limited in storage capacity to much less that the capacity of a single chip containing just high-speed memory. Therefore the relatively high miss rate of the on-chip cache tends to limit substantially processor performance, in view of the disparity between the execution speed of the CPU and the access time of the static RAM cache.

The speed disparity between the high-speed processor and static RAM cache memory has encouraged cache designers to place a "primary" cache of very high speed memory between the processor and the "secondary" static RAM cache. The construction of such a "hierarchical" cache memory, however, has been impractical due to the huge number of input/output lines and the associated buffers and multiplexing circuitry required for interfacing the secondary cache memory with the main memory and the primary cache memory, and the need for keeping the primary and secondary cache memories in close proximity to the processor to minimize signal transmission delay.

SUMMARY OF THE INVENTION

Briefly, in accordance with the present invention, an integrated circuit chip for a hierarchical cache memory has a first data input terminal for receiving data from a central processing unit, a first data output terminal for transmitting data to the central processing unit, a second data output terminal for sequential transmission of bits of data to a main memory, and a second data input terminal for sequential reception of bits of information from the main memory. The integrated circuit includes a high-speed primary memory, and a lower speed secondary memory of greater storage capacity than the primary memory. At any given time, a multi-bit word is addressed in the secondary memory, and a corresponding multi-bit word is addressed in the primary memory. A selected bit of the multi-bit word addressed in the primary memory is asserted on the first data output line. The primary and secondary memories are interconnected by a first multi-line bus for transferring a multi-bit word read from the second memory to the primary memory, and by a second multi-line bus for transferring a multi-bit word read from the primary memory to the secondary memory. The second data input terminal and the second data output terminal are linked to the secondary memory for exchanging the word addressed in the secondary memory with a multi-bit word in the main memory by sequential transmission of bits during a writeback and refill operation. This architecture minimizes the number of data interconnections at the chip boundary and confines to the chip a huge number of interconnections between the primary memory and the second memory.

In a preferred arrangement, data inputs of the primary memory and data inputs of the secondary memory are wired in parallel to the outputs of a register used a common write buffer. The register has four mutually-exclusive operating modes including (1) a first mode wherein the register is loaded with a word of data read from the primary memory; (2) a second mode wherein the register is loaded with a word of data read from the secondary memory; (3) a third mode wherein the register is loaded with data received on the first data input terminal from the central processing unit; and (4) a fourth mode wherein data is unloaded from the register and transmitted from the second data output terminal to the main memory while data received on the second data input terminal from the main memory is loaded into the register.

In a preferred implementation, the register is a serial/parallel shift register having a serial data input connected to the second data input terminal for receiving data from the main memory, a serial data output connected to the second data output terminal for transmitting data to the main memory, a first set of parallel inputs connected to data outputs of the secondary memory, a second set of parallel data inputs each connected to the first data input terminal for receiving data from the central processing unit, and a third set of parallel data inputs connected to data outputs of the primary memory. To permit the data processor to address a selected data output line of the primary memory, the integrated circuit chip includes a multiplexer having a selection control inputs connected to address terminals, data input lines connected to the data output lines of the primary memory, and a data output connected to the first data output terminal. To permit the data processor to write data to the primary cache from a selected data input line of the primary memory, the integrated circuit chip includes a decoder having data inputs connected in parallel to the select inputs of the multiplexer, and having data outputs connected to respective write enable inputs of the primary cache memory.

DESCRIPTION OF THE DRAWINGS

Other objects and advantages of the invention will become apparent upon reading the following detailed description and upon reference to the drawings in which.

Figure 1:
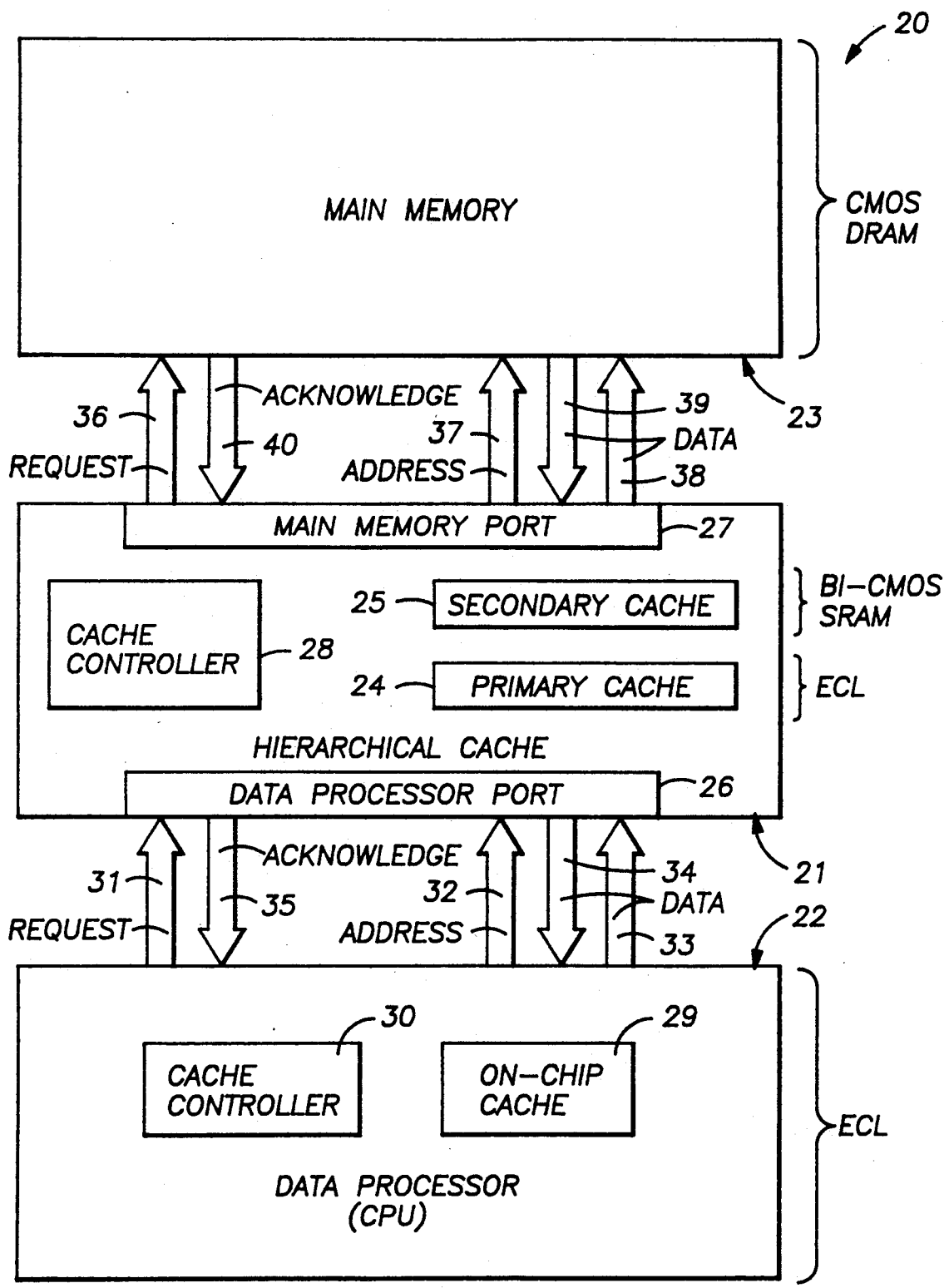
FIG. 1 is a block diagram of a data processing system using a hierarchical cache of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1, there is shown a block diagram generally designated 20 of a data processing system incorporating a hierarchical cache 21 in accordance with the present invention. The data processing system 20 also includes a data processor 22 and a main memory 23. The data processor 22, for example, is a central processing unit (CPU) that executes instructions in a computer program. The instructions include memory access instructions which instruct the data processor to read data from a specified source address in main memory or write specified data to a specified destination address in main memory.

The cost of memory is a major factor in the overall cost of the data processing system 20. Although memories have become relatively inexpensive, there are and always will be memories with varying storage capacities and performance characteristics available at different costs. The cost of memory, for example, is proportional to the storage capacity and in general is proportional to the speed of the memory. Unfortunately memory speed has a substantial influence on the execution speed of the data processor 22. This is especially true in the case of so-called "reduced instruction set" computers (RISC) which are intentionally designed to execute an instruction set which has been limited and optimized for execution speed. Using emitter-coupled logic (ECL) technology, for example, it is practical to fabricate a single-chip data processor 22 that has a cycle time on the order of three nanoseconds. To prevent the data processor in this case from being stalled during the execution of a memory access instruction, it would be desirable for the memory to have a corresponding cycle time of about three nanoseconds. Such a requirement, however, is especially severe because a high-speed and consequently high-power integrated circuit technology such as ECL is required, and the memory would have to be severely limited in capacity due to the constraints of power dissipation, signal transmission time, and ultimately the relatively high cost of ECL memory.

A common solution to these problems is to use a small, high-speed buffer memory, called the cache, to hold the most recently used program instructions and/or data items. The cache is inserted between the data processor 22 and the main memory 23. For high-speed pipelined processors, it is common to use two separate cache memories, one for holding instructions, and the other for holding data. The hierarchical cache 21 in FIG. 1, for example, is used for holding data. When the data processor 22 executes a memory access instruction, the data processor 22 requests the data from the cache 21. If the requested data resides in the cache 21, the data can be obtained quickly from the cache without accessing the main memory 23.

A cache including just ECL memory, however, provides a rather poor solution to the problem of compensating for the great disparity between the cycle speed of the data processor 22 and the main memory 23 when the main memory is comprised of conventional complementary metal-oxide semiconductor (CMOS) dynamic RAM (DRAM) memory chips. Due to the limitations of high power dissipation, signal transmission delay between the data processor 22 and the cache, and cost, the performance of the data processing system 20 would be severely limited if the ECL cache had to access the main memory 23 each time that a miss would occur. Since the ECL cache memory would have a rather high miss rate, it should have a backing store that has a latency of no more than about 10 times its own latency. The main memory 23, for example, typically has an access time of at least 100 nanoseconds, and therefore the penalty for accessing the main memory during a miss would be at least 30 cycles of the data processor or ECL cache memory. A solution to this problem, which is shown in FIG. 1, is to use a hierarchical cache 21 which includes both a primary cache 24 of high-speed ECL memory, and a secondary cache 25 of an intermediate-speed memory such as CMOS static ram (SRAM).

The use of the secondary cache 25, however, introduces a number of problems. To limit signal transmission delay, the secondary cache 25 should be close to the primary cache 24, yet it is even more critical to keep the primary cache in close proximity to the data processor 22. In addition, the secondary cache 24 should have a relatively high storage capacity and should have a relatively large block size so that system performance is not limited by the time required for refilling the primary cache 24 from the secondary cache 25. This requires a huge number of signal lines for interconnecting the secondary cache 25 with the main memory 23 and the primary cache 24. These considerations have previously required secondary cache memories to be placed on a printed wiring board between the data processor and the main memory, which introduces a good deal of complexity and transmission delay, with a corresponding loss of reliability and performance.

In accordance with an important aspect of the present invention, these problems are solved by placing portions of both the primary cache 24 and the secondary cache 25 on the same integrated circuits so that the huge number of data lines interconnecting the primary and secondary cache are entirely located on the integrated circuits. In addition, the overall number and size of the integrated circuit packages in the hierarchical cache 21 is reduced because the fundamental constraints on the numbers of integrated circuit packages is different for the primary cache 24 and the secondary cache 25. If the primary cache 24 were confined to individual ECL integrated circuits, the primary factor determining the number of integrated circuit packages would be the power dissipation of the ECL memory elements in each package. In other words, the maximum storage capacity of an ECL memory on a single integrated circuit chip is primarily limited by power dissipation of the package into which the chip is placed. On the other hand, if the secondary cache memory 25 were to be integrated entirely on separate chips, then the maximum storage capacity per chip would essentially be limited by the maximum size of the integrated circuit chip for economic chip production. Therefore, by placing some secondary cache memory and some primary cache memory on each integrated circuit chip, the total number of chips can be reduced due to the complementary nature of the fundamental constraints on the different integrated circuit technologies or operating conditions desired for the primary cache 24 and the secondary cache 25.

It is possible to use known semiconductor chip manufacturing processes, and in particular a process known as "Bi-CMOS", for combining CMOS memory elements and ECL memory elements on the same integrated circuit chip. It should be noted, however, that the same complementary constraints on the number of integrated circuit packages for both the primary cache and the secondary cache would be present even if the same circuit element technology were used for the primary cache and the secondary cache so long as power dissipation were a primary factor for the primary cache but not the secondary cache. This could be true, for example, in bipolar technology such as ECL or integrated injection logic ($I^2L$) in which the circuit designer is free to adjust the power dissipation of various logic components on the same chip so as to achieve high speed at the expense of high-power dissipation for the primary cache but can select low-power dissipation for the secondary cache 25 since high speed is not necessary in this case. If circuit technology were the only criteria for selecting the relative memory capacities of the primary cache and the secondary cache, for example, each of the integrated circuits making up the primary cache 24 and the secondary cache 25 would have a maximum size dictated by economic constraints and would also dissipate the maximum amount of power permitted for the economic packaging of the chip.

Placing a portion of both the primary cache 24 and the secondary cache 25 on the same chip, however, introduces additional problems related to the desirability of limiting the number of input-output lines to each chip. As will be further described below in connection with FIG. 2, these problems are solved by using a common address bus to the data memories of both the primary cache 24 and the secondary cache 25, and by using a common register for writing data into both the primary and secondary cache memories. In particular, the write register may receive data from either the primary cache 24, the secondary cache 25, or a data processor port 26 or a main memory port 27. This sharing of the address bus and write register between the primary cache 24 and the secondary cache 25 dictates that the hierarchical cache 21 should use a common cache controller 28 for coordinating data write-back and refill for both the primary cache 24 and the secondary cache 25.

Although the hierarchical cache 21 may have a primary cache 24 with a cycle speed matched to the cycle speed of the data processor 22, it is still desirable for the data processor 22 to have a small on-chip cache 29 and an associated on-chip cache controller 30. In this case, it is possible for the data processor 22 to access the on-chip cache 29 in a fraction of a cycle due to the absence of inter-chip data transmission delays. The on-chip cache 29 is similar to a register file. In particular, the on-chip cache 29 and the on-chip cache controller 30 operate in a similar fashion to the primary cache 24 and the cache controller 28, as further described below with reference to FIGS. 2, 9 and 10.

In general terms, the data processor 22 sends memory access requests, addresses and data to be written in memory to the hierarchical cache 21, and the hierarchical cache returns acknowledgements of the requests and corresponding data read from memory. For this purpose the hierarchical cache 21 has a data processor port 26 linked to the data processor 22 via a request bus 31, an acknowledgement bus 35, an address bus 32, and two unidirectional data busses 33 and 34. The request bus, for example, includes at least two lines for conveying a request code denoting a read request, a write request, a flush request, or the absence of a request (a no-op) during each cycle of a high-speed system clock. The acknowledgement bus, for example, includes at least three lines for conveying a stall signal indicating that the data processor must not send any additional requests, a read data valid signal for acknowledging the completion of a read request, and a memory fault signal for interrupting program execution.

To obtain requested data from the main memory 23 when the requested data cannot be found in the hierarchical cache 21, the hierarchical cache includes a main memory port 27 from which a number of busses extend to the main memory. These busses include a request bus 36, an acknowledgement bus 40, an address bus 37, and two uni-directional data busses 37 and 38. Two data busses are provided so that refill data and write-back data can be exchanged simultaneously, as further described below.

Figure 2A:
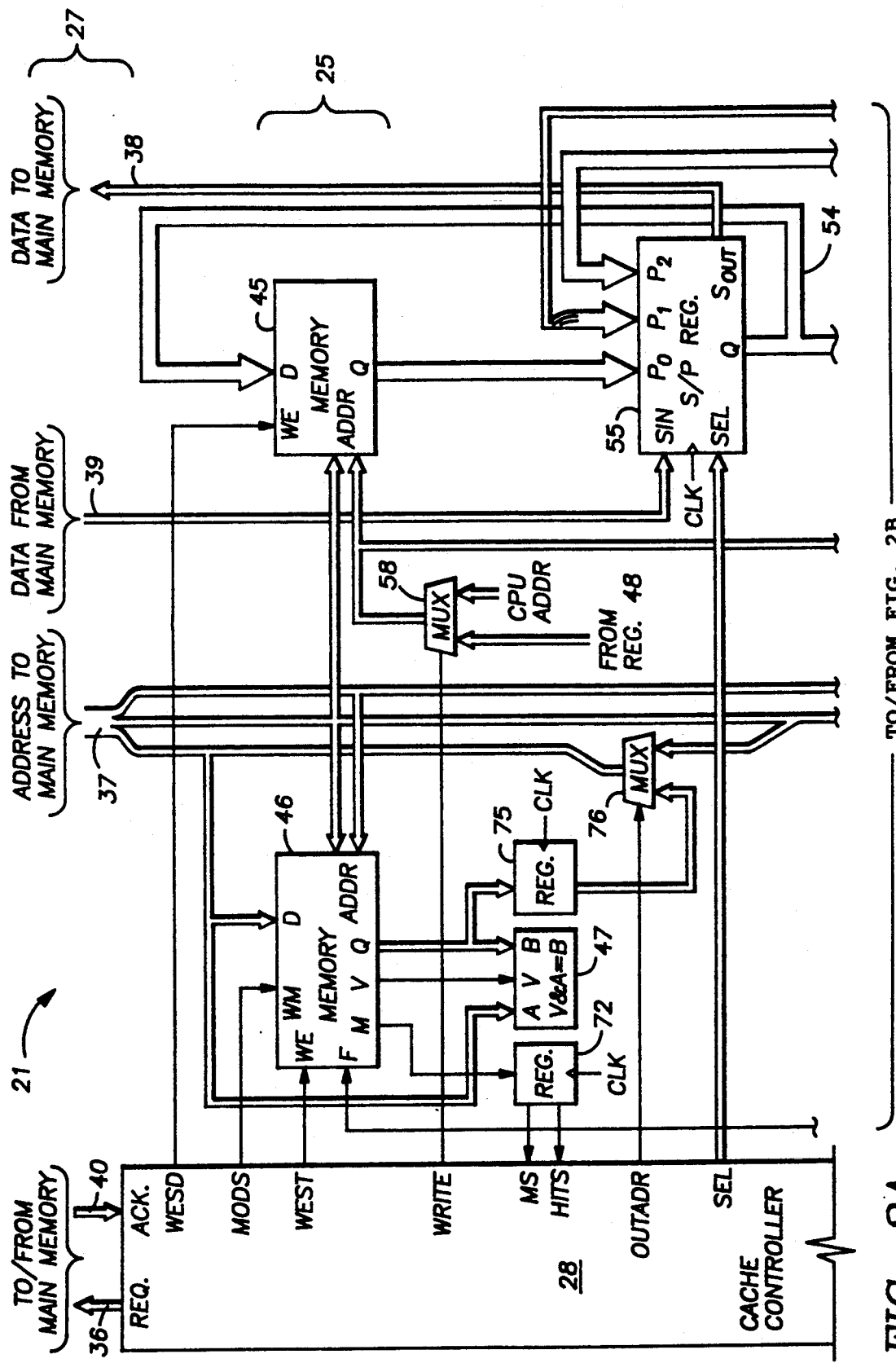
FIGS. 2A and 2B together comprise a block diagram of the hierarchical cache of FIG. 1.
Figure 2B:
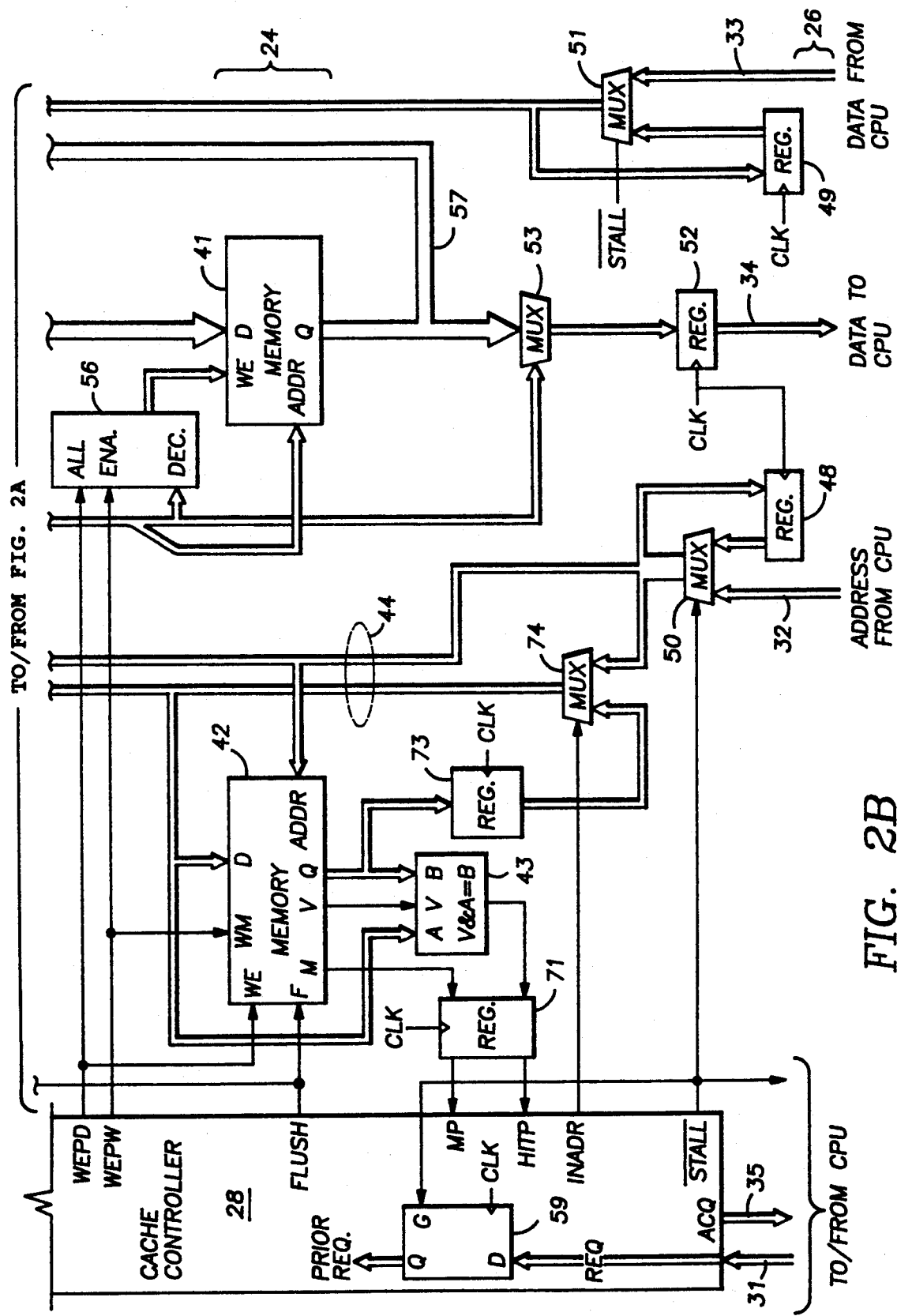

Turning now to FIGS. 2A and 2B, there is shown a more detailed block diagram of the hierarchical cache 21. As shown in FIG. 2B, the primary cache 24 includes a memory 41 for holding blocks of data, a memory 42 for holding corresponding address tags, and a comparator 43 for comparing the address tags stored in memory 42 to an index portion of an address on an internal address bus generally designated 44. In a similar fashion, as shown in FIG. 2A, the secondary cache 25 includes a memory 45 for data blocks, a memory 46 for address tags, and a tag comparator 47. Because a single tag comparator and tag memory are provided with each data memory, the hierarchical cache 21 is "one-way" set associative. As will be further described below with reference to FIGS. 12 and 13, however, the hierarchical cache 21 is easily constructed as a multiple-set associative cache by providing multiple sets of tag memories and tag comparators for each of the primary cache and secondary cache memories.

Preferably the hierarchical cache operates in synchronous fashion in response to a clocking signal (CLK), and stall registers 48, 49 (FIG. 2B) are used for pipelining the data flow between the data processor and the hierarchical cache. Stall register 48 holds an address and stall register 49 holds data from the data processor when the cache controller 28 asserts a stall signal. The stall signal controls multiplexers 50 and 51 to select the contents of stall registers 48 and 49, respectively, when the stall signal is asserted.

It is further desirable to pipeline the accessing of the primary cache tag memory 42 with the accessing of the primary cache data memory 41 for at least the writing of data. As shown in FIGS. 2A and 2B, the hierarchical cache is direct mapped, and therefore it is necessary to check for a matching tag, signalling a "hit", before writing to the data memory, or else the data may be written to a cache block that is associated with an address different from the desired address. The pipelining of the desired address from the tag memory to the data memory can be done by addressing the tag memory when the desired address appears on the address bus 32, and later addressing the data memory when the desired address is received in the stall register 48. For handling read requests, however, it is sometimes possible to address the tag memory and the data memory simultaneously. Data read from the memory are received in an output register 52 (FIG. 2B) and later transmitted to the data processor when the "hit" signal is available to either confirm or invalidate the data. When the tag memory and the data memory are addressed simultaneously, a bypass multiplexer 58 (FIG. 2A) addresses the data memory 41 with the CPU address from the address bus 32 instead of the address in the stall register 48.

Because it is desirable for the cache data blocks to be much larger than the number of data lines in the CPU data bus 34, a multiplexer 53 (FIG. 2B) is responsive a number of least significant address bits for selecting a portion of a data block to be transmitted to the data processing unit. Each cache data block, for example, includes 1024 bits, and the multiplexer 53 is responsive to five least significant address bits to select a 32-bit long word from the cache block. Preferably the primary cache 24 and the secondary cache 25 have the same size of cache block, so that data can be rapidly transferred between the data memory 41 of the primary cache and the data memory 45 of the secondary cache. As shown in FIGS. 2A and 2B, the data inputs of the two data memories 41, 45 are connected in parallel by a wide bus 54 having a single line for each bit in the cache block.

As will be further described below, the wide bus 54 is entirely internal to the integrated circuits which are used for constructing the two data memories 41, 45. In addition, the hierarchical cache 21 is provided with a serial/parallel register 55 (FIG. 2A) that serves as a write buffer for both of the data memories 41, 45 and is also used for parallel communication between the data memories 41, 45, as well as refill and write-back from the main memory. Data flows through the serial/parallel register from the secondary cache to refill the primary cache for references that miss in the primary, but hit in the secondary. Moreover, before a cache block containing modified data in the primary cache is refilled with new data, the modified data flows over a wide bus 57 from the primary cache and through the serial/parallel register 55 to the secondary cache.

Furthermore, the serial/parallel register operates as a serial shift register to serve as both a refill buffer and a write-back buffer when refilling or writing back data between the main memory and the hierarchical cache. As will be more clearly understood from FIG. 4, the data buses 38 and 39 interconnecting the hierarchical cache and the main memory, for example, are 32-bit buses and 1024 bits of data can be swapped between the serial/parallel register 55 and main memory in 32 clock cycles.

The serial/parallel register 55 has four different operating modes in response to a two-bit select signal (SEL) from the cache controller 28. For SEL=0, the serial/parallel register 55 receives the data output of the secondary cache 25 for refill of the primary cache 24. For SEL=1, the serial/parallel register receives thirty-two copies of the 32-bit longword from the data processor, as will be more fully described below with reference to FIG. 4. A selected one of the thirty-two copies, as selected by an address decoder 56, can be written into an addressed position in the cache block in the data memory 41 of the primary cache. For SEL=2, the output of the data memory 41 of the primary cache is received into the serial/parallel register 55 for write-back to the secondary cache 25 During the write-back process, which requires a number of cycles, the address to the data memory 41 does not change so that the contents of the serial/parallel register 55 do not change as the register is clocked. For SEL=3, the serial/parallel register 55 operates in a serial mode to shift in refill data from the main memory and shift out write-back data to the main memory.

For the sake of illustration, the primary cache 24 and the secondary cache 25 are each shown as a direct mapped cache. When a miss occurs, the contents of the desired address location in the tag memory indicates higher order address bits of any data that may be present in the desired cache block. The presence of data is indicated by valid flags (V) stored in the tag memories 42, 46. The hierarchical cache 21 is also shown as a write-back rather than a write-through cache. Therefore, if modified data are present in a desired cache block during a miss, that data must be written back. Modified data are indicated by modify flags (M) in the tag memories.

Figure 3:
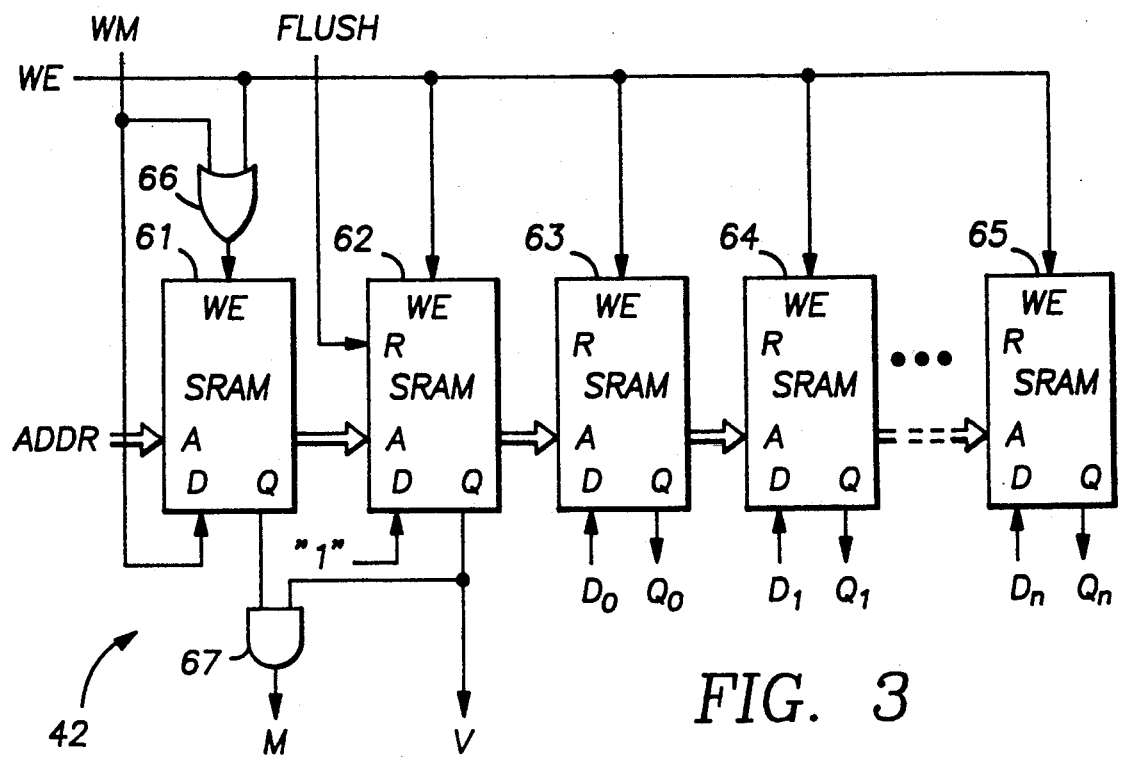
FIG. 3 is a block diagram of tag memory used in the hierarchical cache.

As further shown in the block diagram of FIG. 3, each of the tag memories 42, 46 are organized so that the modify flags (M) and the valid flags (V) are automatically updated during a write to the tag memory and a flush of the tag memory. As shown, the tag memory includes a single-bit static RAM 61 to hold the modify flags, a single-bit static RAM 62 to hold the valid flags, and a number of single-bit static RAMs 63, 64, 65 to hold tag bits corresponding to high order address bits. The write enable input of the static RAM 61 for the modify flags is provided by an OR gate 66 which combines the write enable for the tag memory 42, 46 with the write modify input (WM). The other static RAMs 62, 63, 64, 65 directly receive the write enable signal for the tag memory. In addition, the static RAM 61 for the modify flags has a data input receiving the write modify signal (WM). Therefore, the modify flag is cleared when the tag memory is updated by a write enable (WE), and is set when the WM signal is asserted during the modification of the data. The single-bit static RAM 62 for the valid flags is especially constructed so that all of the bits in this memory 62 can be reset or cleared simultaneously in response to a FLUSH signal. The data input to this memory 62 is wired to a logic high so as to set the valid flag of the current address when the write enable (WE) is asserted during cache refill. The data output of the static RAM 61 for the modify flags and the data output of the static RAM 62 for the valid flags are combined in an AND gate 67 to provide a modify signal which is asserted only when the modify flags are valid.

Returning now to FIG. 2B, it can be seen that the modify signal from the tag memory 42 and a hit signal from the tag comparator 43 pass through a register 71 and are received by the cache controller 28. In a similar fashion, the modify signal and the hit signal for the tag memory 46 of the secondary cache 25 (FIG. 2A) are received in a register 72 and passed to the cache controller 28. When the cache controller 28 determines that a miss has occurred during access of the primary cache and determines that the addressed cache block includes modified data, it initiates a write-back operation by writing the modified data from the primary cache to the secondary cache. Due to the fact that a miss occurred, the address associated with the modified data is different from the address on the address bus 44. The address of the modified data is received in a register 73 (FIG. 2B). During the next cycle, the cache controller 28 operates a multiplexer 74 to place the address of the modified data on the address bus 44 so that this address is passed to the secondary cache 25 (FIG. 2A) to enable the write-back of the modified data to the secondary cache. In a similar fashion, the secondary cache 25 includes a register 75 and a multiplexer 76 which are operated by the cache controller 28 when a miss occurs in the secondary cache and modified data is written back to the main memory.

Figure 4:
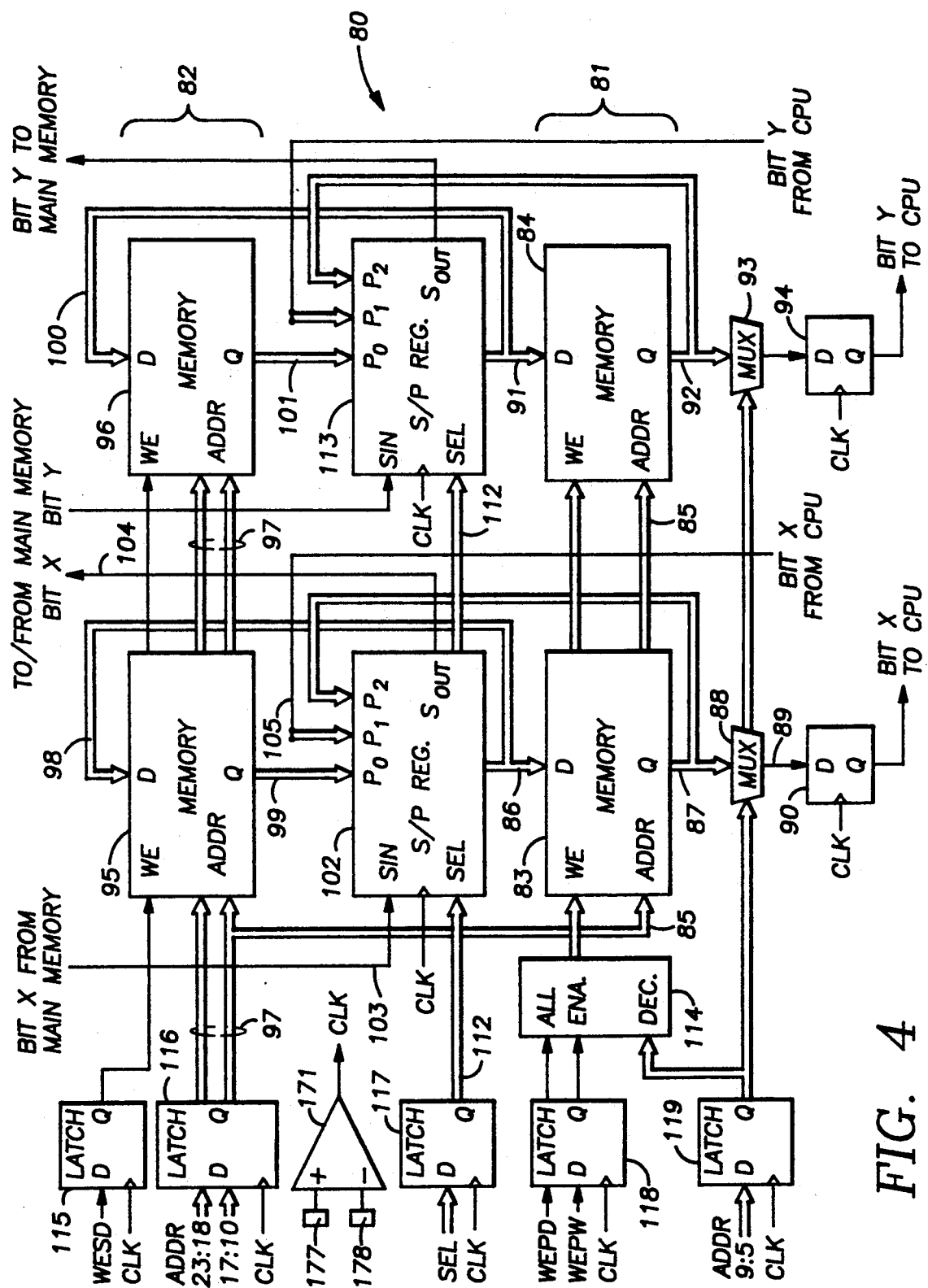
FIG. 4 is a block diagram of an integrated circuit in accordance with the invention, including portions of both a primary cache memory and a secondary cache memory.

Turning now to FIG. 4, there is shown a schematic diagram of an integrated circuit 80 which includes both a portion 81 of the primary cache memory and a portion 82 of the secondary cache memory. In particular, the data memory 41, the data memory 45, the register 52, the multiplexer 53, the bus 54, the serial/parallel register 55, the decoder 56, and the bus 57 as shown in FIG. 2 are integrated on sixteen integrated circuits as shown in FIG. 4. The integrated circuit 80 is preferably fabricated using a BiCMOS process, and packaged in a 48-lead TAB configuration. As further described below, the integrated circuit would then be called a hierarchical 512K×2 BiCMOS/8K ×2 ECL synchronous RAM.

The portion 81 of the primary cache memory includes an 8K-bit ECL memory 83 and an 8K-bit ECL memory 84. These 8K-bit ECL memories 83, 84 are organized as arrays of 256×32 bits, to provide 256 separately addressable cache block segments of 32 bits each. The 256 cache block segments are addressed by eight address lines (carrying address bits 17 to 10) on an address bus 85. In the memory 83, thirty-two bits of data can be written into the addressed cache block segment from a data bus 86 including thirty-two data lines, and all thirty-two bits of an addressed cache block segment can be read out onto an output bus 87 including thirty-two data lines. A particular bit of data is selected by a multiplexer 88 having thirty-two input lines and a single output line 89. This selected bit is latched in a delay flip-flop 90 which is part of the register 52 shown in FIG. 2. The delay flip-flop eliminates any possible race condition with the input latches, provides maximum output valid time, and completes a fully pipelined segment when the integrated circuit 80 is incorporated into a data processing system. In a similar fashion, the address bus 85 continues to the memory 84, which has a 32-bit data input bus 91 and a 32-bit data output bus 92. A particular bit on the output bus 92 is selected by a multiplexer 93 and is received in a delay flip-flop 94 forming part of the output register 52 in FIG. 2.

The portion 82 of the secondary cache includes a memory 95 and a memory 96. Each of these memories is a 512K-bit CMOS static memory, arranged as a 16K×32 bit array. A particular one of the 16K blocks in each array is addressed by a 14-bit address (address bits 23 to 10) on a common address bus 97. The memory 95 has a 32-bit data input bus 98, and a 32-bit data output bus 99. The memory 96 also has a 32-bit data input bus 100 and a 32-bit data output bus 101.

For transferring data between the memories 83 and 95, the data input bus 86 of the memory 83 is wired in parallel with the data input bus 98 of the memory 95, and these data input buses are also wired in parallel to the output of a 32-bit serial/parallel shift register 102. The serial/parallel shift register 102 forms a part of the serial/parallel register 55 shown in FIG. 2. The serial/parallel shift register 102 has a serial input line 103 receiving a bit of data from the main memory port (27 in FIG. 1), and has a serial data output line 104 for transmitting a data bit to the main memory port (27 in FIG. 1). The serial/parallel shift register 102 further includes three separate parallel inputs. The first input ($P_0$) is connected to the data output bus 99 of the memory 95. The second parallel input ($P_1$) has thirty-two input lines but the input lines are wired together to a single line 105 for receiving a data bit from the data processor port (26 in FIG. 1). In addition, the serial/parallel shift register 102 includes a third parallel input ($P_2$) which is connected to the data output bus 87 of the memory 83.

Figure 5:
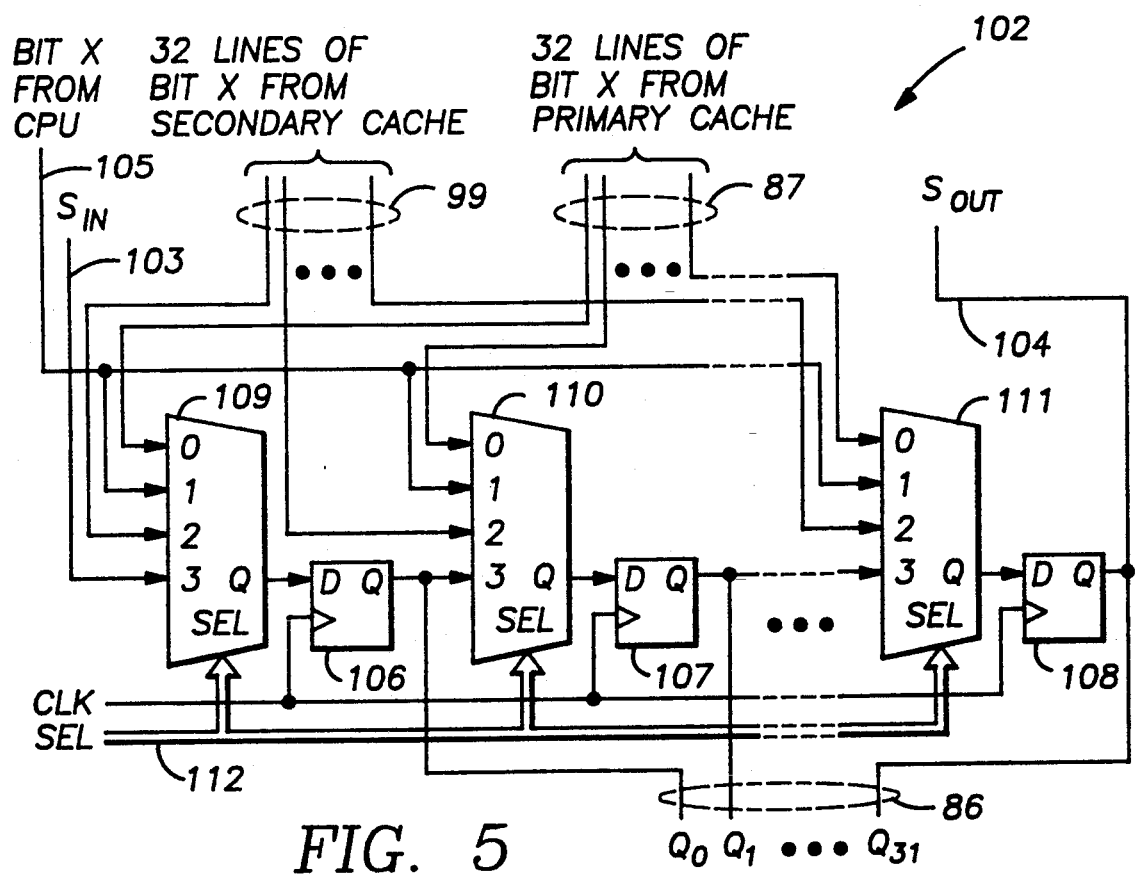
FIG. 5 is a schematic diagram of a serial/parallel shift register used for interconnecting the portions of the primary and secondary cache memories in the integrated circuit of FIG. 4.

Turning for a moment to FIG. 5, there is shown a detailed schematic diagram of the serial/parallel shift register 102. The register 102 includes thirty-two delay flip-flops 106, 107, 108 and thirty-two four-input multiplexers 109, 110, 111. The combination of each multiplexer and its respective delay flip-flop is known as a "multiplexing scan register" that is similar to the H945 latch macro in the Motorola, Inc. MCA10000 (MCA3) cell library. The multiplexers 109, 110, 111 have their select inputs wired in parallel to a two-line control bus 112.

Returning now to FIG. 4, the memory 84 and the memory 96 are interconnected in a similar fashion through a second serial/parallel shift register 113 that is similar to serial/parallel shift register 102.

In order to reduce the number of input and output leads to the integrated circuit 80, the integrated circuit includes a decoder 114 that is identical in function to the decoder 56 shown in FIG. 2.

For reducing the criticality of clocking skews, the integrated circuit 80 includes input latches 115, 116, 117, 118 and 119 for all of the control and address inputs to the integrated circuit. The latches are pass/hold state devices that pass the inputs during the first half of each clock cycle and hold the input states during the second half of each clock cycle. At the end of the clock cycle, the data outputs of the primary memory portions 83, 84 are clocked into the delay flip-flops 90, 94, and data are clocked into the delay flip-flops in the serial/parallel registers 102 and 113. In contrast to the input latches which merely hold data during the second half of the clock cycle, the delay flip-flops are edge-triggered devices triggered on the clock edge at the end of the clock cycle.

Figure 6:
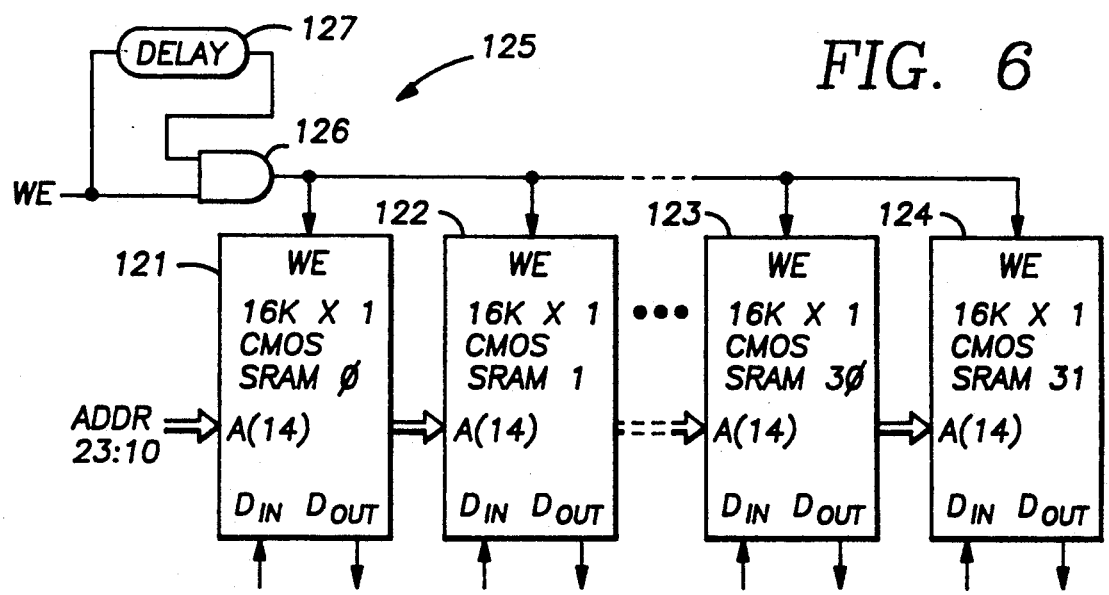
FIG. 6 is a schematic diagram of the portion of the secondary cache memory in the integrated circuit of FIG. 4.

Turning now to FIG. 6, there is shown a detailed schematic diagram of the portion (95 in FIG. 4) of the memory in the secondary cache. The portion of the memory includes thirty-two 16K×1 bit CMOS static RAMS 121, 122, 123, 124. A reader unfamiliar with the construction of CMOS static random access memories may refer to Hamid Partovi, et al. U.S. application Ser. No. 07/508,082 filed Apr. 11, 1990. Also shown in FIG. 6 is timing logic generally designated 125 that ensures that the CMOS static RAM memories 121, 122, 123, 124 receive write enable signals only after sufficient time has elapsed for the individual memory elements in the memories to be addressed. This timing logic includes an AND gate 126 and a signal delay 127. The signal delay is, for example, a string of CMOS inverters that match the propagation delay through the address decoders in the CMOS memories.

Figure 7:
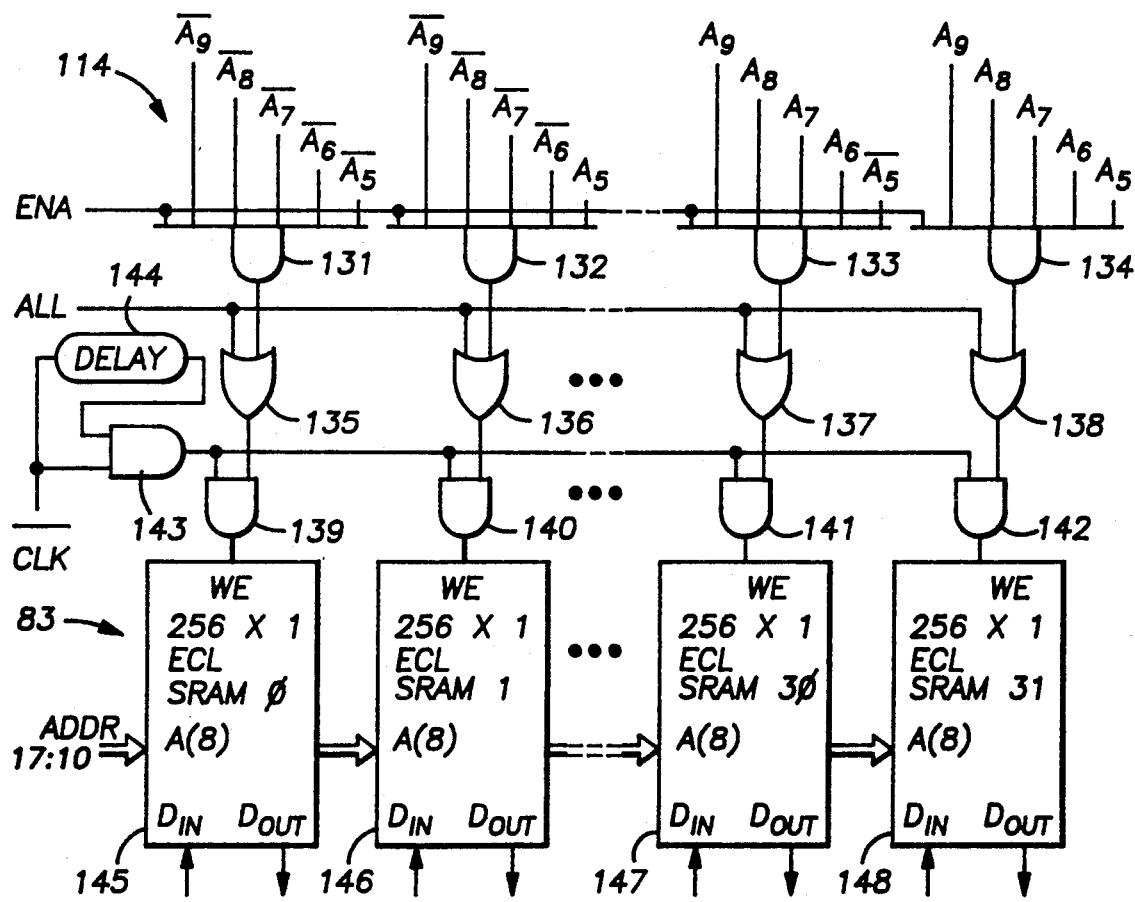
FIG. 7 is a schematic diagram of an address decoder and the portion of the secondary cache memory used in the integrated circuit of FIG. 4.

Turning now to FIG. 7, there is shown a detailed schematic diagram of the address decoder 114 and the ECL memory 83 in FIG. 4. The decoder 114 includes a first level of AND gates 131, 132, 133, 134 that make up a 5-bit binary decoder. The address decoder 14 further includes a second level of OR gates 135, 136, 137 and 138 for enabling data to be written simultaneously to all thirty-two locations of an addressed cache block segment. The decoder 114 further includes a third level of AND gates for self-timing of the write operation. This third level of gates 139, 140, 141, 142 is enabled during the second, unasserted clock phase. The unasserted clock phase must be of sufficient duration to allow for the worst case storage cell write timing. In addition, the self-timing logic includes a gate 143 and a delay 144 ensuring that the write enable pulse is asserted only after sufficient time for decoding of the addresses and selection of the addressed memory cells in the ECL memory 83. The ECL memory 83 includes thirty-two 256-bit memory cell arrays 145, 146, 147, 148. A person unfamiliar with the construction ECL memory arrays may refer to Guglielmi et al. U.S. Pat. No. 4,712,190 and Grundmann et al. U.S. Patent No. 5,107,462 issued Apr. 21, 1992.

A difference between the portion of the secondary memory in FIG. 6 and the portion of the primary memory in FIG. 7 is that a write to the secondary memory of FIG. 6 always occurs to all of the secondary memory arrays 121, 122, 123, and 124. In an alternative construction, the portion of the secondary memory in FIG. 6 could be provided with an address decoder similar to the decoder 114 of FIG. 7 to enable writing to all of the secondary memory arrays, or to enable writing to selected ones of the secondary memory arrays.

Figure 8:
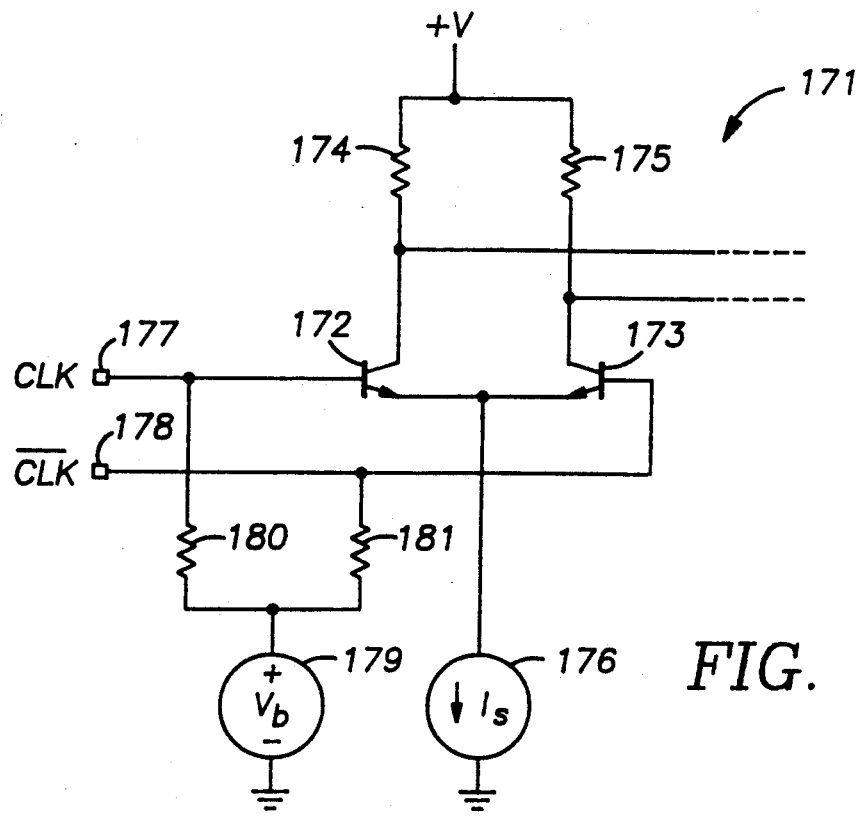
FIG. 8 is a schematic diagram of a clock input buffer in the form of a differential amplifier to permit either a single-ended or dual complementary clock signal to be used for clocking the integrated circuit of FIG. 4.

Turning now to FIG. 8, there is shown a schematic diagram of a clock input buffer permitting the integrated circuit of FIG. 4 to be driven by a pair of complementary clock signals, or by a single clock signal. The input buffer includes a differential amplifier having a pair of NPN transistors 172, 173, a pair of load resistors 174, 175, and a current sink 176. The circuit is similar to an ECL inverter, with the input signals being received on input leads 177, 178.

To enable the buffer 171 to be driven by a single clock input signal on either one of the leads 177, 178, the input buffer 171 further includes a source of bias voltage 179 having a value at the average of the high and low levels of the clocking signal. The bias source 179 is connected to the leads 177 and 178 through respective resistors 180 and 181.

Figure 9:
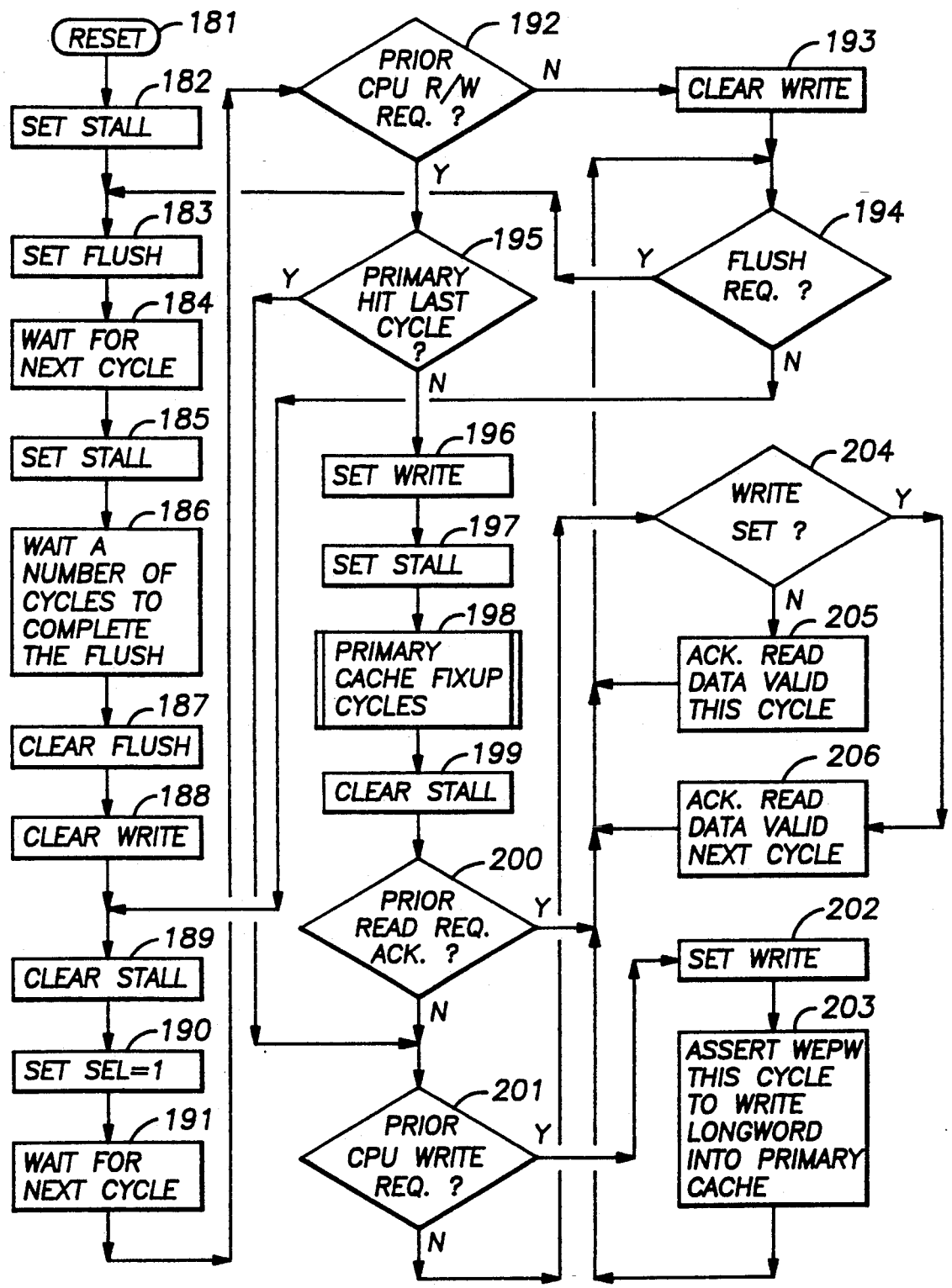
FIG. 9 is a flowchart of control logic for the hierarchical cache of FIG. 1.

Turning now to FIG. 9, there is shown a flowchart of a control sequence for execution by the cache controller 28 of FIG. 2 to service requests from the processing unit 22 of FIG. 1. The cache controller 28 is a sequential state machine which determines output signals and a next state as a combinational logic function of its input signals and its present state. For the sake of illustration, the states and the combinational logic are shown in flowchart form so as to more clearly describe the operation of the hierarchical cache.

The cache controller 28 enters an initial state in response to a system reset signal as depicted in step 181. In this reset state, the cache controller asserts the stall signal in step 182, and also asserts the flush signal in step 183. Then in step 184 the cache controller waits for the next cycle. In step 185 the stall signal is again set, and in step 186 the cache controller waits a sufficient number of additional cycles to complete the flush. These additional cycles are needed due to the relatively slow response of the secondary tag memory 46.

In step 187 during a new clock cycle, the flush signal is cleared, and in step 188, the write signal is cleared. In step 189, the stall signal is cleared, and in step 190, the select signal is set to one, so that the serial/parallel register (55 in FIG. 2) will receive any longword from the data processor. In this clock cycle the hierarchical cache will respond to its first request from the data processor (or the first request following a flush). When this first request is a "no-op" or a flush, it is simply ignored. When the first request is a read or write request, the primary tag memory is addressed during this cycle, addressing of the secondary tag memory will begin this cycle, and write data will be received in the serial/parallel register at the end of this cycle. In step 191, the cache controller waits for the next cycle.

In step 192, the cache controller checks whether the prior data processing request was a read or write request. If not, then it must have been a no-op or flush. In this case, in step 193, the cache controller clears the write signal to eliminate any "bubble" in the address pipeline between the primary tag and primary data memories (42 and 41, respectively, in FIG. 2). The elimination of any such bubble would permit a pending read request to be completed during the present cycle. Then in step 194, the cache controller checks whether the present request from the data processing unit is a flush. If so, the control sequence for the cache controller returns to step 183 to perform the flush operation as described above. Otherwise, the control sequence returns to step 189.

If in step 192 the cache controller finds that the prior data processor request was a read or write request, then in step 195 the cache controller inspects the primary hit signal (HITP in FIG. 2) from the register 71 in FIG. 2 to determine whether there was a hit in the primary tag memory (42 in FIG. 2) during the previous cycle. If so, then it is necessary to stall the data processor and to fix up the primary cache before the prior read or write request can be completed. For this purpose, in step 196 the cache controller sets the write signal and in step 197 sets the stall signal so that the hierarchical cache will use the address stored in the stall register (48 in FIG. 2) instead of the address of the present request which is asserted on the address bus (32 in FIG. 2) from the CPU. Next in step 198, the cache controller performs a number of primary fix-up cycles, as further described below with reference to FIG. 10, in order to ensure that the desired data will be found in the primary cache. Then in step 199, the stall signal is cleared, because desired data is being or has been received in the output register (51 in FIG. 2), and data from the data processor can be written to the primary cache during the current cycle. In step 200 the cache controller checks whether the prior request from the data processor is a read request that was previously acknowledged during refill from the main memory (in step 242 of FIG. 11); in this case, the control sequence returns to step 194 to check whether the present request is a flush.

In step 201, the cache controller determines whether the prior request was a read or write request. When the prior request is a write request, the write signal is set in step 202 to handle the situation where steps 196 to 199 are bypassed when a hit is found in step 195. Then in step 203, the WEPW signal is asserted so that a longword of data from the data processor is written from the serial/parallel register 55 into the data memory 41 of the primary cache.

When in step 201 the cache controller finds that the prior request is a read request, the cache controller checks, in step 204, whether the write signal has been set. This is for the benefit of the case where steps 196 to 200 are bypassed in the event that a primary hit is found in step 195. If the write signal is not set, then the desired read data is already in the output register (52 in FIG. 2). Otherwise, the read data will appear in the output register (52 in FIG. 2) during the next cycle, so that in step 206, valid read data is acknowledged during the next cycle. Steps 205 and 206, for example, could be performed with the aid of a delay-type flip-flop having asynchronous set and reset inputs. In this case, valid read data is acknowledged during the present cycle using the asynchronous set input. Valid read data is acknowledged during the next cycle by asserting a logical one on the delay input of the delay flip-flop during the present cycle. The data output of this delay flip-flop would be a bit of the acknowledge signal on the acknowledgment bus (35 in FIG. 2) of the cache controller. In any case, the control sequence for the cache controller continues in step 194.

Figure 10:
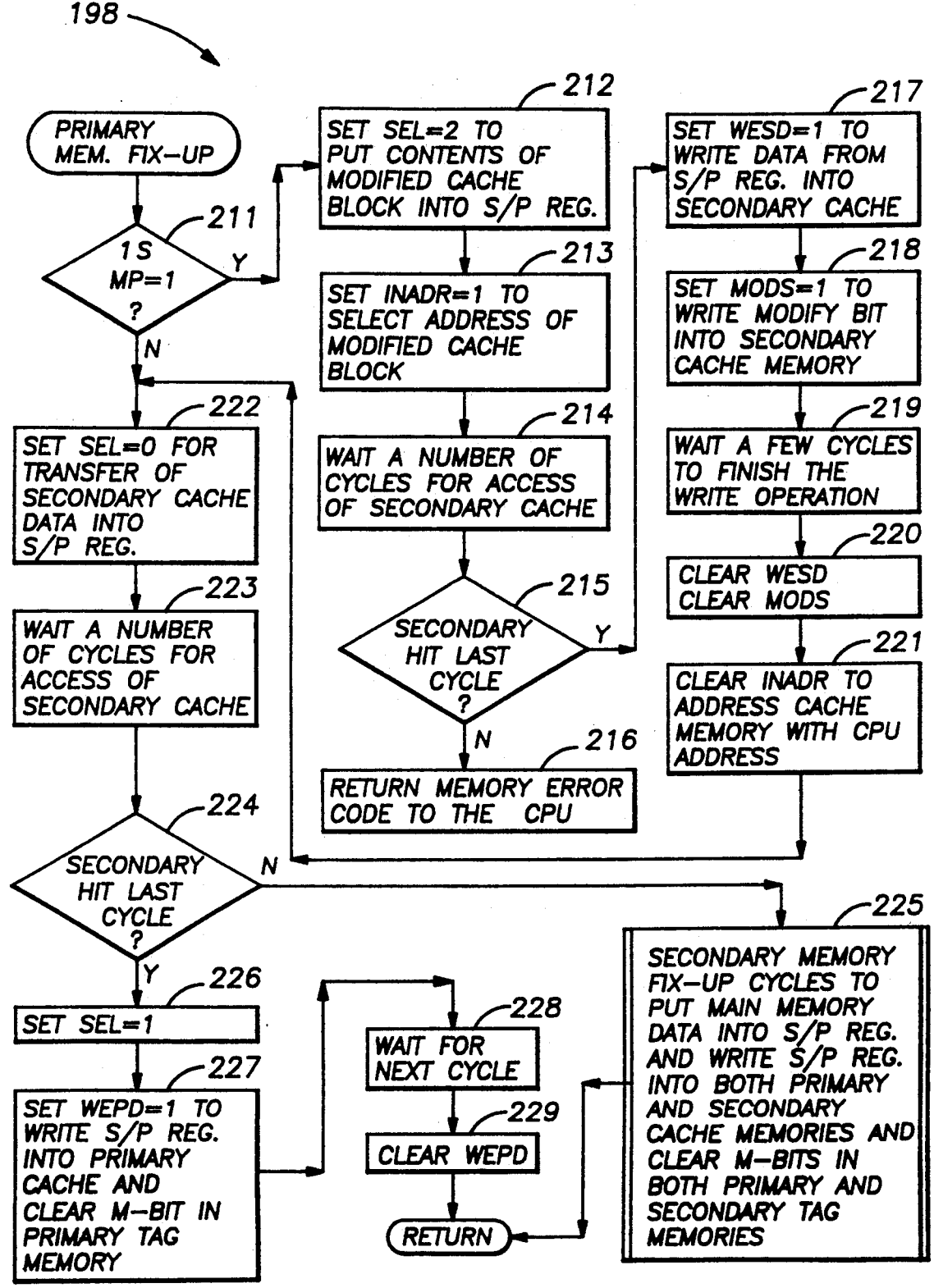
FIG. 10 is a flowchart of the control logic used to fix up the primary cache when a primary miss occurs.

Turning now to FIG. 10, there is shown a flowchart of the control cycles for fixing up the primary cache when the cache controller finds in step 195 of FIG. 9 that a miss in the primary cache has occurred. In other words, the flowchart in FIG. 10 represents the steps in box 198 of FIG. 9. In the first step 21 of FIG. 10, the cache controller checks whether the cache block having been addressed in the primary tag memory (42 in FIG. 2) during the last cycle has been modified. To do this, the cache controller looks at the modify signal from the register 71 of FIG. 2. If this modify signal is asserted, then the cache controller must first perform a write-back sequence to write the modified data back to the secondary cache or the main memory, before the addressed cache block is refilled with the desired data.

To perform the write-back, in step 212 SEL is set to two so as to put the contents of the modified cache block into the serial/parallel register (55 in FIG. 2). Next in step 213, INADR is set to one to select the address of the modified cache block for addressing the secondary cache. Then in step 214, the cache controller waits a predetermined number of cycles sufficient for the secondary cache to be accessed. Next in step 215, the cache controller checks the secondary hit signal (HITS) from the register 72 in FIG. 2. Because the modify flag in the primary cache is set only by refilling from the secondary cache, there should have been a hit when accessing the secondary cache. Therefore, if a hit in the secondary cache did not occur, then in step 216 the cache controller senses an error and returns an error code to the data processing unit. The error code, for example, causes the data processor to recognize a memory fault, terminate execution of the current program, and reset the cache controller.

When a secondary hit is found in step 215, the cache controller can then write the modified data to the data memory (45 in FIG. 2) of the secondary cache. For this purpose, in step 217, the cache controller sets WESD to one. Then in step 218, the cache controller sets MODS to one in order to write a modified bit into the tag memory (46 in FIG. 2) of the secondary cache. Then in step 219, the cache controller waits a few cycles to finish the write operation. Finally, in step 220 the cache controller clears WESD and MODS to terminate the write operation, and in step 221, the cache controller clears INADR to address the secondary cache with the address of the desired data for refilling the primary cache. This completes the write-back sequence.

The refill sequence begins in step 222. The cache controller sets SEL to zero for transfer of secondary cache data into the serial/parallel register (55 in FIG. 2). Then in step 223, the cache controller waits a number of cycles for accessing the secondary cache. Next in step 224, the cache controller checks whether a hit occurred in the secondary cache. If not, then in step 225, the cache controller executes a number of secondary cache memory fix-up cycles as further described below with reference to FIG. 11, in order to put main memory data into the serial/parallel register and write the contents of the serial/parallel register into both the primary and secondary cache data memories, and to clear the modify flags in the tag memories of both the primary and secondary caches. These secondary memory fix-up cycles also fix up the primary memory.

When a hit in the secondary cache is found in step 224, then in step 226, the cache controller sets SEL equal to one in order to refill the serial/parallel register 55 with any write data held in the data stall register (49 in FIG. 2). Then in step 227, the cache controller asserts WEPD during the present cycle to write the contents of the serial/parallel register into the primary data memory (41 in FIG. 2) and to clear the modify flag in the primary tag memory (42 in FIG. 2). After waiting for the next cycle in step 228, the cache controller clears WEPD in step 229, and returns to step 199 in FIG. 9.

Figure 11:
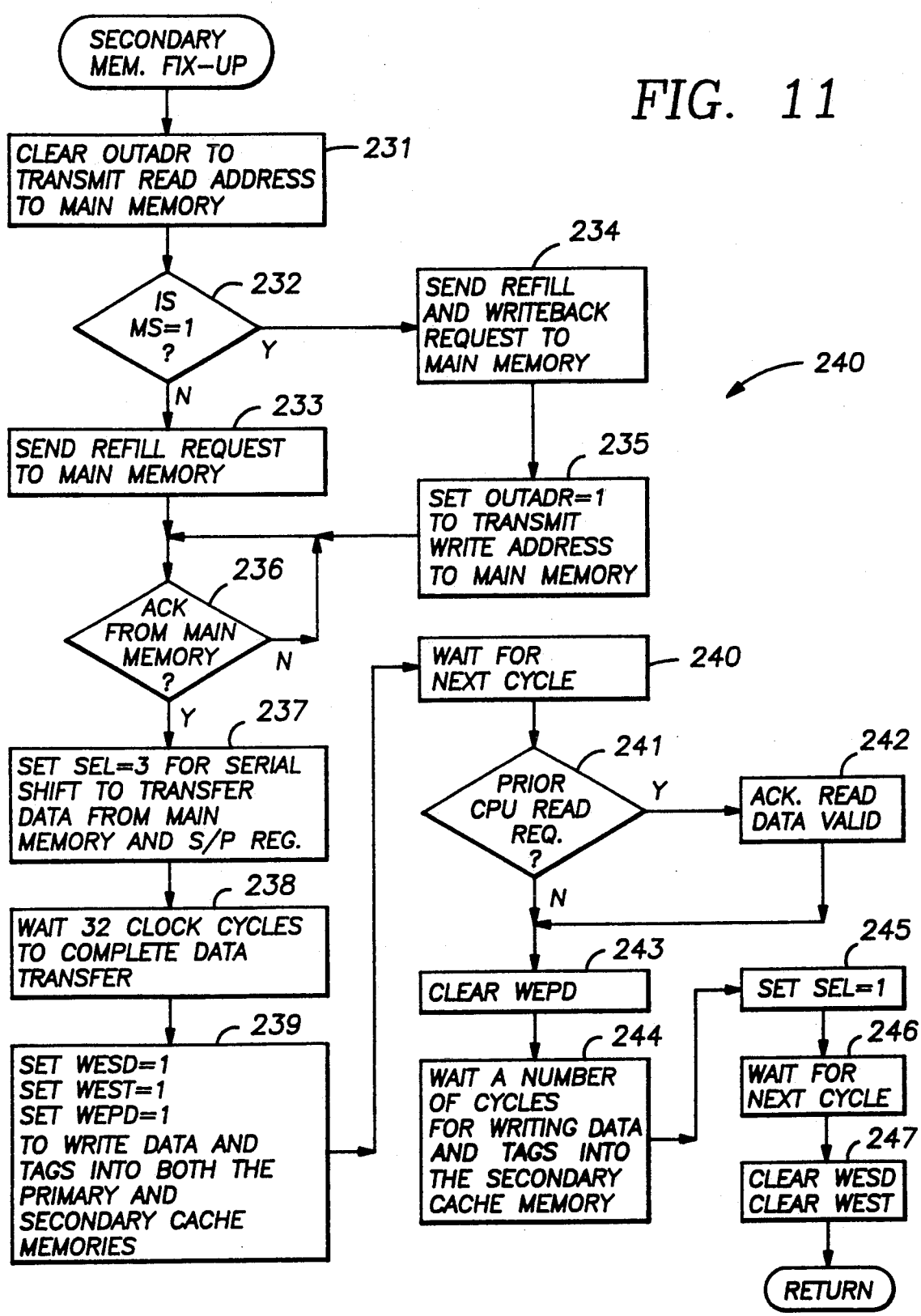
FIG. 11 is a flowchart of the control logic used to fix up the secondary cache when a secondary miss occurs.

Turning now to FIG. 11, there is shown a flowchart of the steps for fixing up the secondary memory. These steps correspond to the box 225 in FIG. 10.

In the first step 231 in FIG. 11, the cache controller clears OUTADR to transmit a read address to main memory. Then in step 232, the cache controller checks whether the modify flag in the secondary cache block has been set. If not, then in step 233, the cache controller sends a refill request to main memory. Otherwise, in step 234, the cache controller sends a refill and write-back request to main memory, and in step 235, in the next cycle, the cache controller sets OUTADR equal one to transmit the write address to main memory.

Next in step 236, the cache controller waits for an acknowledgment from main memory, indicating that the main memory is now transmitting the desired refill data. In response, in step 237, the cache controller sets SEL equal to three for a serial shift in the serial/parallel register (55 in FIG. ) to transfer data between the main memory and the serial/parallel register. In step 238, the cache controller waits 32 clock cycles in order to complete the data transfer. Then in step 239, the cache controller sets the control signals to write the data and tags into both the primary and the secondary cache memories. In particular, the cache controller sets WESD to one, sets WEST to one, and sets WEPD to one. Then in step 240, the cache controller waits for the next cycle. In the next cycle, the refill data has been written into the primary memory 41, and in the process becomes transferred into the output register 52. Therefore, in step 241, the cache controller checks whether the prior request from the data processor is a read request. If so, then in step 242 the cache controller acknowledges to the data processor that the desired data is available.

Since the write to the primary memory has been completed, in step 243, the cache controller clears WEPD. The refill of the secondary cache, however, takes an additional number of cycles. Therefore, in step 244, the cache controller waits a number of cycles. Then, during the final cycle for writing data to the secondary cache, in step 245, the cache controller sets SEL equal to one and then in step 246, waits for the next cycle. This ensures that the serial/parallel register will be restored with any write data from the data processor so that a write request can be performed during the next cycle. Finally, in step 247, the cache controller clears WESD and WEST and returns to step 199 of FIG. 9.

Figure 12:
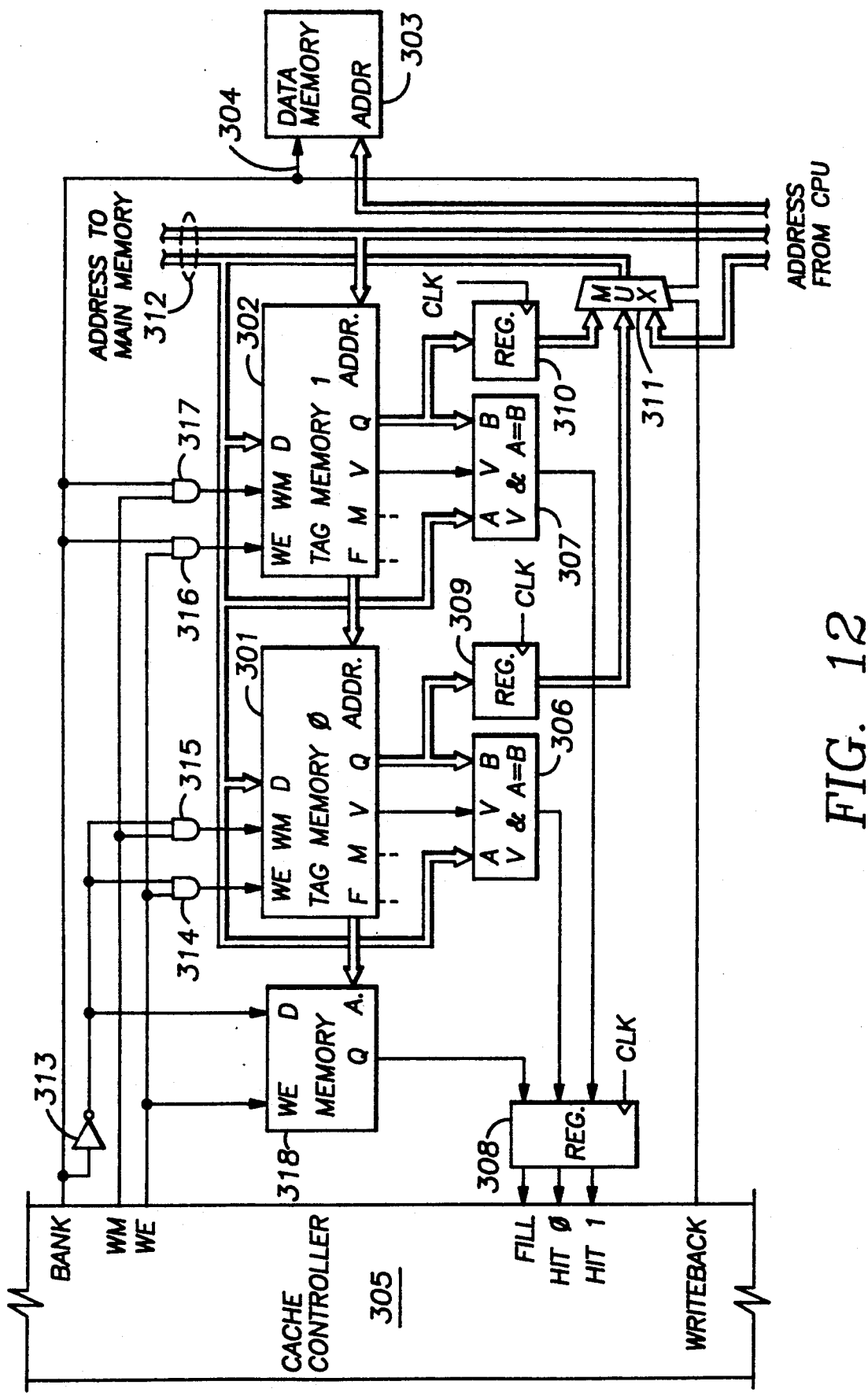
FIG. 12 is a schematic diagram showing how the integrated circuit of FIG. 4 is used in a hierarchical cache memory that is two-way set associative.

Turning now to FIG. 12, there are shown modifications to the tag memories and associated circuits to make the hierarchical cache two-way set associative. By two-way set associative it is meant that each address is mapped directly to two cache blocks. This is done by providing, for each of the primary cache (24 in FIG. 1) and the secondary cache (25 in FIG. 1), two separately addressable tag memories, rather than one, in association with the data memory. Shown in FIG. 12, for example, are tag memories 301 and 302 associated with a data memory 303. The data memory 303 is either one of the primary or secondary data memories formed by combining the integrated circuits 80 of FIG. 4. Each of the tag memories, however, has one-half of the number of addressable blocks as the data memory 303, and therefore the data memory has an additional address input line 304. This address input line 304 receives a bank select signal (BANK) from a cache controller 305.

During a memory access operation, the cache controller must select the bank having data associated with a specified address by inspecting hit signals for each of the two "banks" of cache memory. The tag memories are physically separated into the two banks because it is desirable to address them in parallel. This is not so important for addressing the data memory, because the addressing of the data memory is pipelined with the addressing of the tag memory, and the data memory can be addressed after the desired bank is selected.

The hit signal for the tag memory 301 is provided by a tag comparator 306, and the hit signal for the tag memory 302 is provided by a tag comparator 307. The hit signals are received together in a register 308 and passed to the cache controller 305. The tag memories 301 and 302 also have respective registers 309 and 310 for receiving the tag that is associated with each cache block. During a write-back operation, the tag associated with the modified data to be written back is selected by a multiplexer 311 and asserted on the address bus 312 leading to the secondary cache or the main memory. When the cache is refilled or receives modified data, only the tag memory for the selected bank is updated. This is performed by decoding of the write enable signals (WM, WE) with the bank select signal (BANK) using an inverter 313 and AND gates 314, 315, 316, 317.

When a miss occurs in both of the cache blocks that are directly mapped to a specified address, it is necessary to choose one of the cache blocks for refilling. For this purpose, an addressable memory 318 remembers which cache block was last refilled.

Figure 13:
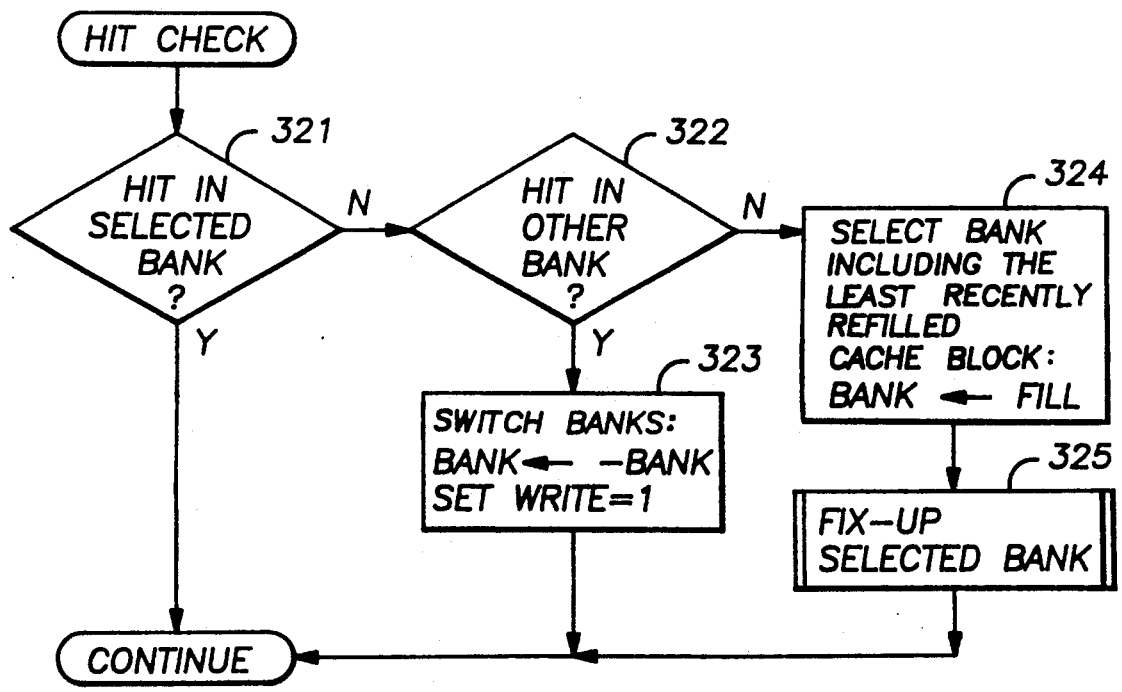
FIG. 13 is a flowchart of the additional control logic used for the two-way set associative cache memory of FIG. 12.

The additional steps in the cache controller sequence for the two-way associative cache of FIG. 12 are shown in the flowchart of FIG. 13. In a first step 321, the cache controller checks whether there is a hit in the selected bank. If not, then in step 322 the cache controller checks whether there was a hit in the other bank. If so, in step 323 the cache controller switches the bank selection signal, and also sets the write flag to one, so that a read or write will be performed in the current cycle using the bank for which the hit occurred. As shown in step 323 of the flowchart, the arrow "←" is an assignment symbol indicating that the banks are switched by complementing the bank selection signal "BANK" shown in FIG. 12. If there was not a hit in neither of the tag memories, then one of the cache blocks must be refilled. In step 324 the bank including the least recently refilled cache block is selected, and cache refill cycles are performed in step 325. For the primary memory, the refill cycles 325 would include, for example, steps 196 to 200 of FIG. 9. As shown in step 324 of the flowchart, the bank including the least recently refilled cache block is selected by replacing the value of the "BANK" signal with the value of the "FILL" signal. As shown in FIG. 12, the cache controller 305 receives the "FILL" signal from the register 308.

In view of the above, there has been described an integrated circuit cache memory in which two levels of random access memory are included in a single integrated circuit. The two levels of memory are interconnected by data busses having a large number of parallel lines, but these data busses are contained entirely within the integrated circuit. This provides extremely high hit rates, very low latency, very fast access time, and very dense packaging that permits many of the integrated circuits to be placed as close to a data processor as possible. In the preferred construction of the integrated circuit, the two levels of random access memory are interconnected by a serial/parallel buffer that can selectively operate as a write buffer, a refill buffer, a write-back buffer, or as a serial/parallel shift register for the exchange of write-back and refill data to and from a main memory. Therefore the integrated circuit is a fully functional component for constructing the data paths of a hierarchical cache, and it is applicable to a wide range of cache organizations and data processor systems.

What is claimed is:

1. An integrated circuit chip for a hierarchical cache memory system, said integrated circuit chip comprising:
   (a) a plurality of terminals for connecting said integrated circuit chip to external circuits external to said integrated circuit chip; said terminals including a plurality of input terminals for receiving signals from said external circuits, and a plurality of output terminals for transmitting signals from said integrated circuit chip to said external circuits; said input terminals including
      (i) a first data input terminal, and
      (ii) a second data input terminal,
      and said output terminals including
      (v) a first data out put terminal, and
      (vi) a second data output terminal;
   (b) a high-speed random access primary memory having a plurality of addressable multi-bit storage locations;
   (c) a random access secondary memory having a speed lower than said primary memory, a plurality of addressable multi-bit storage locations, and a storage capacity greater than said primary memory;
   (d) first means connected to said primary memory and said secondary memory for addressing a first multi-bit storage location in said secondary memory and addressing a corresponding second multi-bit storage location in said primary memory;
   (e) second means connected to said primary memory and said first data output terminal for asserting on said first data output terminal a first bit of information read from a selected bit position of said second multi-bit storage location in said primary memory;
   (f) third means connected to said primary memory and said first data output terminal for writing into a selected bit position of said second multi-bit storage location in said primary memory a second bit of information having been asserted on said first data input terminal by said external circuits;
   (g) fourth means connected to said primary memory and said secondary memory for reading a first multi-bit word of data from said first multi-bit storage location in said secondary memory and writing said first multi-bit word of data read from said secondary memory into said second multi-bit storage location in said primary memory, wherein said fourth means includes a first multi-line bus having a line corresponding to each bit of said first multi-bit storage location for transferring said first multi-bit word read from said secondary memory to said primary memory;
   (h) fifth means connected to said primary memory and said secondary memory for reading a second multi-bit word of data from said second multi-bit storage location in said primary memory and writing said second multi-bit word of data read from said primary memory into said first multi-bit storage location in said secondary memory, wherein said fifth means includes a second multi-line bus having a line corresponding to each bit of said second multi-bit storage location for transferring said second multi-bit word read from said primary memory to said secondary memory; and
   (i) sixth means connected to said secondary memory and said second data input terminal and said second data output terminal for sequentially asserting on said second data output terminal multiple bits of a third multi-bit word read from said first multi-bit storage location in said secondary memory and writing into said second multi-bit storage location in said secondary memory a fourth multi-bit word including multiple bits having been sequentially asserted on said second data input terminal by said external circuits.

2. The integrated circuit chip as claimed in claim 1, wherein: said input terminals include a plurality of address terminals; said primary memory includes a plurality of address inputs; said secondary memory includes a plurality of address inputs; and said first means includes a connection from each address input of said secondary memory to a corresponding one of said address terminals, and a connection from each address input of said primary memory to a corresponding one of said address inputs of said secondary memory, so that said first and second multi-bit storage locations are addressed simultaneously.

3. The integrated circuit chip as claimed in claim 1, wherein: said input terminals include a plurality of address terminals; said primary memory has a plurality of data outputs; and said second means includes a multiplexer; said multiplexer has a plurality of data inputs each connected to a corresponding one of said data outputs of said primary memory; said multiplexer has a data output line connected to said first data output terminal; and said multiplexer has a plurality of selection control inputs each connected to a corresponding one of said address terminals for selecting an addressed one of said outputs of said primary memory to be connected by said multiplexer to said data first data output terminal.

4. The integrated circuit chip as claimed in claim 1, wherein: said input terminals include a plurality of address terminals; said primary memory has a write enable input for each bit position of said second multi-bit storage location; said third means includes a decoder; said decoder has a plurality of inputs each connected to a corresponding one of said address terminals; and said decoder has a plurality of outputs each connected to a corresponding one of said write enable inputs to enable writing of a bit of information from said first data input terminal to an addressed bit position of said second multi-bit storage location.

5. The integrated circuit chip as claimed in claim 1, which includes a serial-parallel shift register, and wherein: said secondary memory has a plurality of data inputs and a plurality of data outputs; said register has a serial data input connected to said second data input terminal for loading said register with data sequentially received from said external circuits; said register has a serial data output connected to said second data output terminal for sequentially transmitting data from said register to said external circuits; said register has a plurality of parallel data inputs each connected to a corresponding one of said data outputs of said secondary memory; and said register has a plurality of parallel data outputs each connected to a corresponding one of said data inputs of said secondary memory.

6. The integrated circuit chip as claimed in claim 1, which includes a register, and wherein: said primary memory has a plurality of data inputs; said secondary memory has a plurality of data inputs; said register has a plurality of data outputs; and each of said data outputs of said register is connected to a corresponding one of said data inputs of said primary memory and to a corresponding one of said data inputs of said secondary memory.

7. The integrated circuit chip as claimed in claim 6, wherein: said primary memory has a plurality of data outputs; said secondary memory has a plurality of data outputs; said register is a serial-parallel shift register; said register has a serial data input connected to said second data input terminal for sequentially receiving data from said external circuits; said register has a serial data output connected to said second data output terminal for sequentially transmitting data from said register to said external circuits; said register has a first set of parallel data inputs each connected to a corresponding one of said data outputs of said secondary memory for loading said register with said first multi-bit word of data read from said secondary memory; said register has a second set of parallel data inputs each connected to said first data input terminal for loading said register with data received on said first data input terminal from said external circuits; and said register has a third set of parallel data inputs each connected to a corresponding one of said data outputs of said primary memory for loading said register with said second multi-bit word of data read from said primary memory.

8. The integrated circuit chip as claimed in claim 1, wherein said primary memory includes emitter-coupled logic (ECL) memory elements, and said secondary memory includes complementary metal-oxide-semiconductor (CMOS) memory elements.

9. A hierarchical cache memory in a digital computer system, said digital computer system having a central processing unit and a main memory, said hierarchical cache memory comprising:
(a) an address bus having a plurality of address lines for receiving addresses from said central processing unit and for transmitting addresses to said main memory;
(b) a first data input line connected to said central processing unit for receiving data from said central processing unit;
(c) a second data input line connected to said main memory for receiving data from said main memory;
(d) a control line connected to said central processing unit for receiving memory requests from said central processing unit;
(e) a first data output line connected to said central processing unit for receiving data from said central processing unit;
(f) a second data output line connected to said main memory for receiving data from said main memory;
(g) a high-speed random access primary memory having a plurality of address inputs, a plurality of data inputs, a plurality of data outputs, and a write enable input, wherein said first data output line is connected to at least one of said data outputs of said primary memory for transmitting data read from said primary memory to said central processing unit;
(h) a random access secondary memory having a speed lower than said primary memory, a storage capacity greater than said primary memory, a plurality of address inputs, a plurality of data inputs, a plurality of data outputs, and a write enable input, wherein each of said address inputs of said secondary memory is connected to a corresponding one of said address lines of said address bus, and wherein each of said address inputs of said primary memory is connected to a corresponding one of said address inputs of said secondary memory;
(i) a register having a plurality of data outputs, wherein each of said data outputs of said register is connected to a corresponding one of said data inputs of said primary memory and to a corresponding one of said data inputs of said secondary memory such that data in said register is written to said primary memory when said primary memory is enabled from said write enable input of said primary memory and such that data in said register is written into said secondary memory when said secondary memory is enabled from said write enable input of said secondary memory;
(j) means connected to said first data input line, said second data input line, said second data output line, said control line, said data outputs of said primary memory, said write enable input of said primary memory, said data outputs of said secondary memory, said write enable input of said secondary memory, and said register, for controlling data transfer to and from said primary memory and said secondary memory in response to said memory requests and in accordance with four mutually-exclusive operating modes, said four mutually-exclusive operating modes including:
(i) a first mode wherein said register is loaded with data from said data outputs of said primary memory;
(ii) a second mode wherein said register is loaded with data from said data outputs of said secondary memory;
(iii) a third mode wherein said register is loaded with data received on said first data input line from said central processing unit; and
(iv) a fourth mode wherein data is unloaded from said register and transmitted from said second data output line to said main memory while said register is loaded with data received on said second data input line from said main memory.

10. The hierarchical cache memory as claimed in claim 9, which includes a multiplexer having a plurality of data inputs each connected to a corresponding one of said data outputs of said primary memory, wherein: said multiplexer has a data output connected to said first data output line; and said multiplexer has a plurality of selection control inputs each connected to a corresponding one of said address lines for selecting an addressed one of said data outputs of said primary memory to be connected by said multiplexer to said first data output line.

11. The hierarchical cache memory as claimed in claim 9, which includes a decoder, and wherein: said primary memory has a write enable input for each of said data inputs of said primary memory; said decoder has a plurality of inputs each connected to a corresponding one of said address lines; said decoder has a plurality of outputs; and each write enable input of said primary memory is connected to a corresponding one of said outputs of said decoder to enable writing of a bit of information from an addressed one of said data inputs of said primary memory into said primary memory.

12. The hierarchical cache memory as claimed in claim 9, wherein: said register is a serial-parallel shift register; said register has a serial data input connected to said second data input line for sequentially receiving data from said main memory; said register has a serial data output connected to said second data output line for sequentially transmitting data from said register to said main memory; said register has a first set of parallel data inputs each connected to a corresponding one of said data outputs of said secondary memory for loading said register with data read from said secondary memory; said register has a second set of parallel data inputs each connected to said first data input line for loading said register with data received on said first data input line from said central processing unit; and said register has a third set of parallel data inputs each connected to a corresponding one of said data outputs of said primary memory for loading said register with data read from said primary memory.

13. The hierarchical cache memory as claimed in claim 9, wherein said primary memory includes emitter-coupled logic (ECL) memory elements, and said secondary memory includes complementary metal-oxide-semiconductor (CMOS) memory elements.

14. An integrated circuit chip comprising, in combination,
(a) a plurality of terminals for connecting said integrated circuit chip to external circuits external to said integrated circuit chip; said terminals including a plurality of input terminals for receiving signals from said external circuits, and a plurality of output terminals for transmitting signals from said integrated circuit chip to said external circuits; said input terminals including
  (i) a first data input terminal, and
  (ii) a second data input terminal,
  and said output terminals including
  (v) a first data out put terminal, and
  (vi) a second data output terminal;
(b) a high-speed random access primary memory; said primary memory having a plurality of data inputs, a plurality of data outputs, and a plurality of write enable inputs;
(c) a lower speed random access secondary memory of greater storage capacity than said primary memory; said secondary memory having a plurality of data inputs, and a plurality of data outputs;
(d) a multiplexer having selection control inputs; said multiplexer having data inputs each connected to a corresponding one of said data outputs of said primary memory; said multiplexer having a data output connected to said first data output terminal so that a selected one of said data outputs of said primary memory is connected by said multiplexer to said first data output terminal;
(e) a decoder having a plurality of inputs each connected to a corresponding one of said selection control inputs of said multiplexer; said decoder having a plurality of outputs each connected to a corresponding one of said write enable inputs of said primary memory; and
(f) a serial/parallel shift register; said register having a plurality of parallel data outputs each connected to a corresponding one of said data inputs of said primary memory and also connected to a corresponding one of said data inputs of said secondary memory; said register having a first set of parallel data inputs each connected to a corresponding one of said data outputs of said secondary memory for loading said register with a multi-bit word of data read from said secondary memory; said register having a second set of parallel data inputs each connected to said first data input terminal; said register having a third set of parallel data inputs each connected to a corresponding one of said data outputs of said primary memory for loading said register with a multi-bit word of data read from said primary memory; said register having a serial data input connected to said second data input terminal for sequentially loading said register with data received from said external circuits; and said register having a serial data output connected to said second data output terminal for sequentially transmitting data from said register to said external circuits.

15. The integrated circuit chip as claimed in claim 14, further comprising a plurality of address input terminals for receiving address signals from said external circuits; a pair of clock input terminals for receiving a clock signal from said external circuits; a clock buffer having an output connected to a clock input of said register and having a pair of differential inputs each connected to a respective one of said clock input terminals; a source of bias voltage connected to one of said differential inputs; pass-hold latches having clock inputs connected to said output of said clock buffer and having inputs connected to said address input terminals and having outputs connected to address inputs of said primary and secondary memories; and an edge-triggered flip-flop having a data input connected to the data output of said multiplexer, a data output connected to said first data output terminal, and a clock input connected to said output of said clock buffer.

16. The integrated circuit chip as claimed in claim 14, wherein said primary memory includes emitter-coupled logic (ECL) memory elements, and said secondary memory includes complementary metal-oxide-semiconductor (CMOS) memory elements.

* * * * *